(12) United States Patent
Houck et al.

(10) Patent No.: US 11,396,168 B2
(45) Date of Patent: Jul. 26, 2022

(54) MICROWAVED MULTI-PLY STRUCTURES, MICROWAVED PACKAGES, AND METHODS OF STERILIZATION

(71) Applicant: Printpack Illinois, Inc., Elgin, IL (US)

(72) Inventors: Justin Houck, Marietta, GA (US); James Ray, Marietta, GA (US); Nilesh Savargaonkar, Manvel, TX (US)

(73) Assignee: PRINTPACK ILLINOIS, INC., Elgin, IL (US)

( * ) Notice: Subject to any disclaimer, the term of this patent is extended or adjusted under 35 U.S.C. 154(b) by 0 days.

(21) Appl. No.: 17/368,099

(22) Filed: Jul. 6, 2021

(65) Prior Publication Data

US 2021/0331453 A1    Oct. 28, 2021

Related U.S. Application Data

(62) Division of application No. 16/337,256, filed as application No. PCT/US2017/040246 on Jun. 30, 2017, now Pat. No. 11,090,913.

(Continued)

(51) Int. Cl.
   *B32B 27/18* (2006.01)
   *B32B 7/06* (2019.01)

(Continued)

(52) U.S. Cl.
   CPC ............... *B32B 27/18* (2013.01); *B32B 7/06* (2013.01); *B32B 7/12* (2013.01); *B32B 27/16* (2013.01);

(Continued)

(58) Field of Classification Search
   CPC .. B32B 27/18; B32B 7/02; B32B 7/06; B32B 7/12; B32B 27/16; B32B 27/28;

(Continued)

(56) References Cited

U.S. PATENT DOCUMENTS

| 5,770,301 A | 6/1998 | Murai et al. |
| 2004/0175465 A1 | 9/2004 | Buelow et al. |

(Continued)

FOREIGN PATENT DOCUMENTS

| CN | 104476870 A | 4/2015 |
| JP | 2009217178 A | 9/2009 |

(Continued)

OTHER PUBLICATIONS

International Search Report and Written Opinion, PCT/US2016/025642, 12 pages, dated Jul. 8, 2016.

(Continued)

*Primary Examiner* — Michael C Miggins
(74) *Attorney, Agent, or Firm* — Eversheds Sutherland (US) LLP

(57) ABSTRACT

Multi-ply structures are provided that include a barrier film, which has a first polyester layer and a silicon oxide layer, a first adhesive layer, and a sealant film, where the first adhesive layer is located between the barrier film and the sealant film, and where the multi-ply structure has been microwaved in a pressurized vessel. Packages that are formed from the multi-ply structures are also provided in which these packages are microwaved in a pressurized vessel. Methods for sterilization are also provided.

20 Claims, 15 Drawing Sheets

Related U.S. Application Data

(60) Provisional application No. 62/400,768, filed on Sep. 28, 2016.

(51) Int. Cl.
*B32B 7/12* (2006.01)
*B32B 27/16* (2006.01)
*B32B 27/28* (2006.01)
*B32B 27/32* (2006.01)
*B32B 27/34* (2006.01)
*B32B 27/36* (2006.01)

(52) U.S. Cl.
CPC .............. *B32B 27/28* (2013.01); *B32B 27/32* (2013.01); *B32B 27/34* (2013.01); *B32B 27/36* (2013.01); *B32B 2250/04* (2013.01); *B32B 2250/05* (2013.01); *B32B 2255/10* (2013.01); *B32B 2264/00* (2013.01); *B32B 2264/102* (2013.01); *B32B 2307/546* (2013.01); *B32B 2307/7145* (2013.01); *B32B 2307/7242* (2013.01); *B32B 2307/7244* (2013.01); *B32B 2307/7246* (2013.01); *B32B 2307/75* (2013.01); *B32B 2439/40* (2013.01); *B32B 2439/70* (2013.01); *B32B 2439/80* (2013.01)

(58) Field of Classification Search
CPC ......... B32B 27/32; B32B 27/34; B32B 27/36; B32B 2255/10
See application file for complete search history.

(56) References Cited

U.S. PATENT DOCUMENTS

| | | |
|---|---|---|
| 2006/0172098 A1 | 8/2006 | Stevenson |
| 2010/0019021 A1* | 1/2010 | Dixon-Garrett ..... B65D 81/343 229/117.27 |
| 2014/0224836 A1 | 8/2014 | Campanelli et al. |

FOREIGN PATENT DOCUMENTS

| | | |
|---|---|---|
| JP | 2011062977 A | 3/2011 |
| WO | 9533621 A1 | 12/1995 |
| WO | 02074537 A1 | 9/2002 |
| WO | 2013180710 A1 | 12/2013 |
| WO | 2015017967 A1 | 2/2015 |
| WO | 2015171763 A1 | 11/2015 |
| WO | 2016044571 A1 | 3/2016 |

OTHER PUBLICATIONS

International Preliminary Report on Patentability, PCT/US2016/025642, 26 pages, dated Jul. 6, 2017.
International Search Report and Written Opinion, PCT/US17/040248, 12 pages, dated Oct. 24, 2017.

* cited by examiner

MICROWAVED MULTI-PLY STRUCTURES, MICROWAVED PACKAGES, AND METHODS OF STERILIZATION

BACKGROUND

Thermal retort processes have long been used to provide commercial pasteurization and sterilization to improve the microbial safety of refrigerated or shelf-stable food products. In retort processes, the products are heated to temperatures effective to inactivate microorganisms, including spoilage or pathogenic microorganisms, which may be present in the food.

Conventional thermal retort processes generally require high temperature treatment, typically ranging from 121° C. to 132° C. for upwards of 40 minutes including heating, holding, and cooling stages. The most common retort sterilization processes include water immersion and saturated steam processes. In saturated steam processes, a retort vessel containing packaged products (e.g., in pouches, containers, or cans) is filled with steam for about 30 to about 120 minutes. In water immersion processes, the food products are immersed in hot water under pressure in a retort vessel. While acceptable sterilization may be achieved by these processes, thermal treatment for these lengths of time can result in a number of detrimental effects to the food product, including changes in color, aroma, or texture, denaturation or coagulation of protein, and degradation of vitamins and other nutrients.

Given the foregoing drawbacks of conventional retort processes, there is interest in retort processing using microwave energy, such as microwave assisted thermal sterilization (MATS). In MATS, unlike with conventional thermal retort processes, heat is produced directly in the food, thereby substantially reducing the thermal processing time necessary to effectively sterilize the food. As a result, MATS processes, as compared to conventional thermal retort processes, can have, among other attributes, higher throughputs and lower operation costs. Further, the color, texture and other sensory attributes of MATS processed foods can be better compared with those of conventional thermal retorted foods.

Although MATS processes are efficient sterilization processes, they can be harsh on packaging materials because of the temperature and pressure variations involved. Therefore, MATS processes can have an adverse effect on the barrier properties, e.g., the moisture vapor transmission rate (MVTR) and the oxygen transmission rate (OTR), of the resulting microwaved packaging materials. Given that the MVTR and the OTR are important properties of suitable food packaging, it is desirable to reduce these effects by employing suitable packaging material that can better withstand the processing conditions of MATS processes.

Accordingly, there exists a need to provide improved packaging material, such as improved multi-ply structures, that are capable of being sterilized in a MATS process wherein the resulting microwaved material has greater moisture and oxygen barrier properties as compared to conventional packaging material.

SUMMARY

In one aspect, multi-ply structures are provided. In one or more embodiments, the multi-ply structure includes a barrier film, which comprises a first polyester layer and a silicon oxide layer, a first adhesive layer, and a sealant film, wherein the first adhesive layer is located between the barrier film and the sealant film, and wherein the multi-ply structure has been microwaved in a pressurized vessel.

In another aspect, packages are provided. In one or more embodiments, the package includes a multi-ply structure that defines an interior space of the package, and a product disposed within the interior space, wherein the package has been microwaved in a pressurized vessel. In one or more other embodiments, the package includes a container body having a rim, the container body defining an interior space of the package, product disposed within the interior space, and a multi-ply structure affixed to the rim, wherein the package has been microwaved in a pressurized vessel. In either embodiment, the multi-ply structure includes a barrier film comprising a first polyester layer and a silicon oxide layer, a first adhesive layer, and a sealant film, wherein the first adhesive layer is located between the barrier film and the sealant film.

In yet another aspect, methods for sterilization are provided. In one or more embodiments, the method includes feeding a package into a pressurized vessel, the package having product disposed within an interior space of the package, and exposing the package and the product within the pressurized vessel to one or more cycles of microwave energy. The package includes a multi-ply structure that includes a barrier film comprising a first polyester layer and a silicon oxide layer, a first adhesive layer, and a sealant film, wherein the first adhesive layer is located between the barrier film and the sealant film.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1:
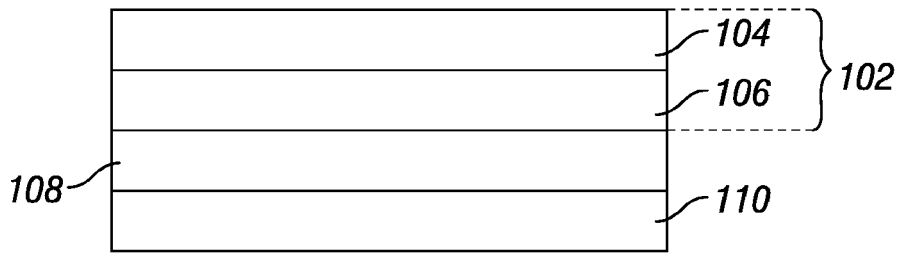
FIG. 1 is a cross-sectional view of a multi-ply structure in accordance with an embodiment of the present disclosure.

Improved multi-ply structures have been developed that address one or more challenges that arise with sterilizing conventional multi-ply structures via microwave-assisted thermal sterilization (MATS) processes. The present multi-ply structures include a barrier film having a polyester layer and a silicon oxide layer, which advantageously protect the multi-ply structures during a MATS process, such that the resulting microwaved multi-ply structures have higher barrier properties as compared to conventional microwaved multi-ply structures.

Several embodiments of multi-ply structures and methods for making the structures, packages and methods for making the packages, and methods of sterilization are described herein. Parameters of different steps, components, and features of the embodiments are described separately, but may be combined consistently with this description of claims, to enable other embodiments as well to be understood by those skilled in the art. Various terms used herein are likewise defined in the description which follows.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In embodiments, "about" can be used to mean, for example, within 10% of the recited value, within 5% of the recited value, or within 2% of the recited value.

Microwaved Multi-Ply Structures and Methods of Manufacture

In accordance with the description, microwaved multi-ply structures that include at least a barrier film, which includes a first polyester layer and a silicon oxide layer, a first adhesive layer, and a sealant film have been developed.

It is also contemplated within this disclosure that in certain embodiments, the polyester layer may be replaced with a biaxially oriented nylon layer.

As used herein, the term "microwaved" when used to modify a multi-ply structure or a package means that the structure or the package was microwaved, i.e., exposed to microwave energy, in a pressurized vessel. That is, the multi-ply structures or the packages of the present disclosure underwent a MATS process, such as those described herein and in U.S. Pat. Nos. 5,436,432, 5,750,966, 7,119,313, 7,230,217, 9,066,376, 9,179,505, and 9,271,338, and in International Publication Nos WO 2016/044571, WO 2016/100539, and WO 2015/171763, all of which are incorporated herein by reference. In some embodiments, the pressurized vessel includes a fluid medium. In some embodiments, the pressurized vessel includes a liquid and the multi-ply structure or the package is at least partially immersed in the liquid.

In embodiments, the microwaved multi-ply structures or packages of the present disclosure are sterilized during the MATS process. Additionally in embodiments where a product is disposed within the package, the product is sterilized during the MATS process. In certain embodiments, the product is a food or drink product, and the product is also pasteurized during the MATS process.

One embodiment of a microwaved multi-ply structure is shown in FIG. 1. The microwaved multi-ply structure 100 includes a barrier film 102, which includes a first polyester layer 104 and a silicon oxide layer 106. The microwaved multi-ply structure 100 further includes a sealant film 110 and a first adhesive layer 108. The first adhesive layer 108 is located between the barrier film 102 and the sealant film 110. In this embodiment, the first polyester layer 104 is the outermost layer of the multi-ply structure 100.

In some embodiments, the microwaved multi-ply structure is flexible. In some embodiments, the microwaved multi-ply structure is substantially polymeric. In certain embodiments, the microwaved multi-ply structure is flexible and substantially polymeric.

As used herein, "substantially polymeric" means having a polymer content of at least 90% based on weight of the multi-ply structure. For example, in some embodiments, the multi-ply structure has a polymer content of about 90% to about 99.9% based on weight of the multi-ply structure. In some embodiments, the multi-ply structure has a polymer content of about 90% to about 95% based on weight of the multi-ply structure. In some embodiments, the multi-ply structure has a polymer content of about 95% to about 99.9% based on weight of the multi-ply structure.

In some embodiments, the barrier film has a thickness from about 36 gauge to 120 gauge, however, the thickness of the barrier film can vary depending on desired package specifications.

As used herein, "outermost layer" means the first layer that is viewed from the outside of a laminated structure and will typically be the outermost layer of a package made with such a structure (e.g., a pouch) or the outermost layer of the portion of a package made with such structure (e.g., lidding).

As used herein, a "polyester layer" is a layer that predominately comprises one or more polyesters. That is, a polyester layer comprises one or more polyesters in an amount of at least 50% based on weight of the polyester layer. In one embodiment, the polyester layer comprises one or more polyesters in an amount of about 80% to about 100% based on weight of the polyester layer. In another embodiment, the polyester layer comprises one or more polyesters in an amount of about 95% to about 100% based on weight of the polyester layer.

A non-limiting example of a suitable polyester includes polyethylene terephthalate (PET), such as biaxially oriented PET (BOPET). It is also contemplated that the one or more polyesters do not include any other polyesters other than PET.

As used herein, an "adhesive layer" is a layer that adheres or bonds different films and/or layers of the microwaved multi-ply structure together. Non-limiting examples of suitable adhesive layer materials are solvent-based adhesives, water-based adhesives, and solvent-less adhesives. Suitable adhesives include, but are not limited to solvent-based polyurethane adhesives.

In embodiments, an adhesive layer is not used to bond the layers of the barrier film together. That is, the barrier film of the present microwaved multi-ply structures does not comprise an adhesive layer. For example, in some embodiments, the silicon oxide layer is vacuum deposited, e.g., by physical or chemical vapor deposition, onto a surface of the first polyester layer.

Inventors have unexpectedly discovered that the present microwaved multi-ply structures have lower moisture vapor transmission rates, lower oxygen transmission rates, or both as compared to a conventional microwaved multi-ply structure, see e.g., Example 1.

Further, it was also discovered that the present microwaved multi-ply structures have at least a lower moisture vapor transmission rate as compared to a comparative structure that has undergone a conventional thermal retort process, see e.g., Example 2. In some instances, the present microwaved multi-ply structures were also found to have a lower oxygen transmission rate than the comparative structures that underwent conventional retorted structures.

The moisture vapor transmission rate is the steady state rate at which water vapor permeates through a structure at specified conditions of temperature and relative humidity, and can be determined using ASTM F1249.

The oxygen transmission rate is the steady state rate at which oxygen gas permeates through a structure at specified conditions of temperature and zero relative humidity, and can be determined using ASTM D3955.

As used herein, a "conventional microwaved multi-ply structure" is a structure that does not include a combination of at least a sealant film, a first adhesive layer, and a barrier film in which the barrier film comprises a first polyester layer and a silicon oxide layer. For example, in some embodiments, a conventional microwaved multi-ply structure has a barrier film that includes aluminum oxide and not silicon oxide, such as an aluminum oxide coated PET.

As used herein, a "comparative multi-ply structure" is simply a non-microwaved sample of the subject microwaved multi-ply structure. That is, the comparative multi-ply structure is the same structure as the microwaved structure except that the comparative multi-ply structure has not been microwaved (i.e., the comparative multi-ply structure has not undergone a MATS process). In some instances, the comparative multi-ply structure has not undergone any thermal retort process, whereas in other instances, the comparative multi-ply structure has undergone a conventional thermal retort process. Similarly, a "comparative moisture vapor transmission rate" when used herein to refer to the moisture vapor transmission rate of a "comparative multi-ply structure" is measured under the same conditions and parameters as the measured moisture vapor transmission rate value of the microwaved multi-ply structure in accordance with the present disclosure.

As used herein, a "conventional thermal retort process" is any thermal retort process other than a MATS process.

In some embodiments, the microwaved multi-ply structure has a moisture vapor transmission rate from about 0.005 g/100 in$^2$/day to about 0.06 g/100 in$^2$/day. In one embodiment, the microwaved multi-ply structure has a moisture vapor transmission rate from about 0.01 g/100 in$^2$/day to about 0.03 g/100 in$^2$/day. In another embodiment, the microwaved multi-ply structure has a moisture vapor transmission rate from about 0.05 g/100 in$^2$/day to about 0.06 g/100 in$^2$/day. In other embodiments, the microwaved multi-ply structure has a moisture vapor transmission rate of 0.005, 0.01 g/100 in$^2$/day, 0.015 g/100 in$^2$/day, 0.02 g/100 in$^2$/day, 0.025 g/100 in$^2$/day, 0.03 g/100 in$^2$/day, 0.035 g/100 in$^2$/day, 0.04 g/100 in$^2$/day, 0.045 g/100 in$^2$/day, 0.05 g/100 in$^2$/day, 0.055 g/100 in$^2$/day, 0.06 g/100 in$^2$/day. The microwaved multi-ply structure of this disclosure can also have a moisture vapor transmission rate between any of these recited moisture vapor transmission rates.

As used herein, a "comparative moisture vapor transmission rate" when used herein to refer to the moisture vapor transmission rate of a "conventional microwaved multi-ply structure" is measured under the same conditions and parameters as the measured moisture vapor transmission rate value of the microwaved multi-ply structure in accordance with the present disclosure.

As used herein, a "comparative moisture vapor transmission rate" when used herein to refer to the moisture vapor transmission rate of a "comparative microwaved multi-ply structure" is measured under the same conditions and parameters as the measured moisture vapor transmission rate value of the microwaved multi-ply structure in accordance with the present disclosure.

In certain embodiments, the present microwaved multi-ply structures have a moisture vapor transmission rate that is lower than a comparative moisture vapor transmission rate of a conventional microwaved multi-ply structure. For example, in some embodiments, the present microwaved multi-ply structure has a moisture vapor transmission rate that is up to 100% lower than a comparative moisture vapor transmission rate of a conventional microwaved multi-ply structure. In one embodiment, the present microwaved multi-ply structure has a moisture vapor transmission rate that is about 50% to about 100% lower than a comparative moisture vapor transmission rate of a conventional microwaved multi-ply structure. In another embodiment, the microwaved multi-ply structure has a moisture vapor transmission rate that is about 70% to about 85% lower than a comparative moisture vapor transmission rate of a conventional microwaved multi-ply structure. In yet another embodiment, the microwaved multi-ply structure has a moisture vapor transmission rate that is about 80% to about 95% lower than a comparative moisture vapor transmission rate of a conventional microwaved multi-ply structure. In other embodiments, the microwaved multi-ply structure has a moisture vapor transmission rate that is 50%, 55%, 60%, 65%, 70%, 75%, 80%, 85%, 90%, 95%, 99%, or 100% lower than a comparative moisture vapor transmission rate of a conventional microwaved multi-ply structure. The microwaved multi-ply structure of this disclosure also may have a moisture vapor transmission rate that is lower than a comparative moisture vapor transmission rate of the conventional microwaved multi-ply structure at a percent value in a range between any of these recited percent values.

In some embodiments, the microwaved multi-ply structure has a moisture vapor transmission rate that is about 0% to about 1,100% greater than a comparative moisture vapor transmission rate of a comparative multi-ply structure that has not been microwaved in the pressurized vessel. In one embodiment, the microwaved multi-ply structure has a moisture vapor transmission rate that is about 0% to about 700% greater than a comparative moisture vapor transmission rate of a comparative multi-ply structure that has not been microwaved in the pressurized vessel. In another embodiment, the microwaved multi-ply structure has a moisture vapor transmission rate that is about 30% to about 250% greater than a comparative moisture vapor transmission rate of a comparative multi-ply structure that has not been microwaved in the pressurized vessel. In other embodiments, the microwaved multi-ply structure has a moisture vapor transmission rate that is 0%, 0.01%, 0.1%, 0.5%, 10%, 5%, 10%, 20%, 30%, 40%, 50%, 60% 70%, 80%, 90%, 100%, 150%, 200%, 2.50%, 300%, 350%, 400% 450%, 500%, 550%, 600%, 650%, 700%, 750%, 800%, 850%, 900%, 950%, 1,000%, or 1,100% greater than a comparative moisture vapor transmission rate of a comparative multi-ply structure that has not been microwaved in the pressurized vessel. The microwaved multi-ply structure of this disclosure also may have a moisture vapor transmission rate that is greater than the comparative moisture vapor transmission rate at a percent value in a range between any of these recited percent values.

In some embodiments, the microwaved multi-ply structure has an oxygen transmission rate from about 0.001 cc/100 in$^2$/day to about 0.03 cc/100 in$^2$/day. In one embodiment, the microwaved multi-ply structure has an oxygen transmission rate from about 0.002 cc/100 in$^2$/day to about 0.02 cc/100 in$^2$/day. In another embodiment, the microwaved multi-ply structure has an oxygen transmission rate from about 0.006 cc/100 in$^2$/day to about 0.01 cc/100 in$^2$/day. In other embodiments, the microwaved multi-ply structure has an oxygen transmission rate of 0.001 cc/100 in$^2$/day, 0.002 cc/100 in$^2$/day, 0.003 cc/100 in$^2$/day, 0.004 cc/100 in$^2$/day, 0.005 cc/100 in$^2$/day, 0.006 cc/100 in$^2$/day, 0.007 cc/100 in$^2$/day, 0.008 cc/100 in$^2$/day, 0.009 cc/100 in$^2$/day, 0.01 cc/100 in$^2$/day, 0.015 cc/100 in$^2$/day, 0.02 cc/100 in$^2$/day, 0.025 cc/100 in$^2$/day, 0.03 cc/100 in$^2$/day. The microwaved multi-ply structure of this disclosure also may have an oxygen transmission rate between any of these recited oxygen transmission rates.

In one embodiment, the microwaved multi-ply structure has a moisture vapor transmission rate from about 0.005 g/100 in$^2$/day to about 0.06 g/100 in$^2$/day and an oxygen transmission rate from about 0.001 cc/100 in$^2$/day to about 0.03 cc/100 in$^2$/day.

As used herein, a "comparative oxygen transmission rate" when used herein to refer to the oxygen transmission rate of a "conventional microwaved multi-ply structure" is measured under the same conditions and parameters as the measured oxygen transmission rate value of the microwaved multi-ply structure in accordance with the present disclosure.

As used herein, a "comparative oxygen transmission rate" when used herein to refer to the oxygen transmission rate of a "comparative multi-ply structure" that has not undergone any thermal retort process is measured under the same conditions and parameters as the measured oxygen transmission rate value of the microwaved multi-ply structure in accordance with the present disclosure.

As used herein, a "comparative oxygen transmission rate" when used herein to refer to the oxygen transmission rate of a "comparative multi-ply structure" that has undergone a conventional thermal retort process is measured under the similar conditions and parameters as the measured oxygen transmission rate value of the microwaved multi-ply structure in accordance with the present disclosure.

In certain embodiments, the present microwaved multi-ply structures have an oxygen transmission rate that is lower than a comparative oxygen transmission rate of a conventional microwaved multi-ply structure. For example, in some embodiments, the present microwaved multi-ply structure has an oxygen transmission rate that is up to 100% lower than a comparative oxygen transmission rate of a conventional microwaved multi-ply structure. In one embodiment, the present microwaved multi-ply structure has an oxygen transmission rate that is between 0% to 100% lower than a comparative oxygen transmission rate of a conventional microwaved multi-ply structure. In another embodiment, the microwaved multi-ply structure has an oxygen transmission rate that is about 50% to about 99% lower than a comparative oxygen transmission rate of a conventional microwaved multi-ply structure. In yet another embodiment, the microwaved multi-ply structure has an oxygen transmission rate that is about 64% to about 90% lower than a comparative oxygen transmission rate of a conventional microwaved multi-ply structure. In other embodiments, the microwaved multi-ply structure has an oxygen transmission rate that is 1%, 5%, 10%, 15%, 20%, 25%, 30%, 35%, 40%, 45%, 50%, 55%, 60%, 65%, 70%, 75%, 80%, 85%, 90%, 95%, 99%, or 100% lower than a comparative oxygen transmission rate of a conventional microwaved multi-ply structure. The microwaved multi-ply structure of this disclosure also may have an oxygen transmission rate that is lower than a comparative oxygen transmission rate of the conventional microwaved multi-ply structure at a percent value in a range between any of these recited percent values.

In one embodiment, the microwaved multi-ply structure has a moisture vapor transmission rate that is about 50% to about 99% lower than a comparative moisture vapor transmission rate of a conventional multi-ply structure, and the microwaved multi-ply structure has an oxygen transmission rate that is between 0% to 100% lower than a comparative oxygen transmission rate of a conventional multi-ply structure.

In some embodiments, the microwaved multi-ply structure has an oxygen transmission rate that is about 0% to about 2,900% greater than a comparative oxygen transmission rate of a comparative multi-ply structure that has not been microwaved in the pressurized vessel. In one embodiment, the microwaved multi-ply structure has an oxygen transmission rate that is about 0% to about 620% greater than a comparative oxygen transmission rate of a comparative multi-ply structure that has not been microwaved in the pressurized vessel. In another embodiment, the microwaved multi-ply structure has an oxygen transmission rate that is about 110% to about 260% greater than a comparative oxygen transmission rate of a comparative multi-ply structure that has not been microwaved in the pressurized vessel. In other embodiments, the microwaved multi-ply structure has an oxygen transmission rate that is 0%, 0.01%, 0.1%, 0.5%, 1%, 5%, 10%, 20%, 30%, 40%, 50%, 60% 70%, 80%, 90%, 100%, 150%, 200%, 250%, 300%, 350%, 400% 450%, 500%, 550%, 600%, 650%, 700%, 750%, 800%, 850%, 900%, 950%, 1,000%, 1,100%, 1,200%, 1,300%, 1,400%, 1,500%, 1,600%, 1,700%, 1,800%, 1,900%, 2,000%, 2,100%, 2,200%, 2,300%, 2,400%, 2,500%, 2,600%, 2,700%, 2,800%, or 2,900% greater than a comparative oxygen transmission rate of a comparative multi-ply structure that has not been microwaved in the pressurized vessel. The microwaved multi-ply structure of this disclosure also may have an oxygen transmission rate that is greater than the comparative oxygen transmission rate at a percent value in a range between any of these recited percent values.

In one embodiment, the microwaved multi-ply structure has a moisture vapor transmission rate that is about 0% to about 1.100% greater than a comparative moisture vapor transmission rate of a comparative multi-ply structure that has not been microwaved in the pressurized vessel, and the microwaved multi-ply structure has an oxygen transmission rate that is about 0% to about 2,900% greater than a comparative oxygen transmission rate of the comparative multi-ply structure.

In some embodiments, the microwaved multi-ply structure does not comprise a microwave energy interactive material, such as those described in International Publication No. WO 2012/148895 (e.g., foil patch, patterned foil, a susceptor, or combinations thereof).

In certain embodiments, the microwaved multi-ply structure further includes additional layers, such as ink layers, nylon layers, additional adhesive layers, additional polyester layers, or any combination thereof. It is also contemplated that any of these additional layers may be omitted from the microwaved multi-ply structure.

Figure 2:
FIG. 2 is across-sectional view of a multi-ply structure in accordance with an embodiment of the present disclosure.

In some embodiments, the microwaved multi-ply structure further comprises an ink layer. For example, as illustrated in FIG. 2, the microwaved multi-ply structure 200, which is a variation of the microwaved multi-ply structure in FIG. 1, has an ink layer 112 that is located between the barrier film 102 and the sealant film 110. In this embodiment, the ink layer 112 is adjacent to the silicon oxide layer 106 and the first polyester layer 104 is the outermost layer of the multi-ply structure 200. Non-limiting examples of suitable ink materials include water-based inks, solvent-based inks, and the like, and combinations thereof.

As used herein, the term "adjacent" means contiguous.

Figure 3:
FIG. 3 is across-sectional view of a multi-ply structure in accordance with an embodiment of the present disclosure.

In certain embodiments, the microwaved multi-ply structure comprises one or more nylon layers and one or more additional adhesive layers. For example, as illustrated in FIG. 3, the microwaved multi-ply structure 300, which is a variation of the microwaved multi-ply structure 100 in FIG. 1, further includes a second adhesive layer 114 and a first nylon layer 116. The second adhesive layer 114 is located between the barrier film 102 and the first nylon layer 116, whereas the first nylon layer 116 is located between the first and the second adhesive layers 108, 114. In this embodiment, the second adhesive layer 114 is adjacent to the silicon oxide layer 106 and the first polyester layer 104 is the outermost layer of the multi-ply structure 300.

As used herein, a "nylon layer" of the multi-ply structure that is separate from the sealant film (i.e., a nylon layer that is not part of the sealant film) is a layer that predominately comprises one or more nylons. That is, a nylon layer comprises one or more nylons in an amount of at least 50% based on weight of the nylon layer. In one embodiment, the nylon layer comprises one or more nylons in an amount of about 80% to about 100% based on weight of the nylon layer. In another embodiment, the nylon layer comprises one or more nylons in an amount of about 95% to about 100% based on weight of the nylon layer. Non-limiting examples of suitable nylons include biaxially oriented nylons, cast nylons, and the like, and combinations thereof. For example, in one embodiment, the one or more nylon layers are biaxially oriented nylon. Non-limiting examples of suitable nylon materials includes polyamides, such as nylon 6, nylon 66, and nylon 6/66.

Figure 4:
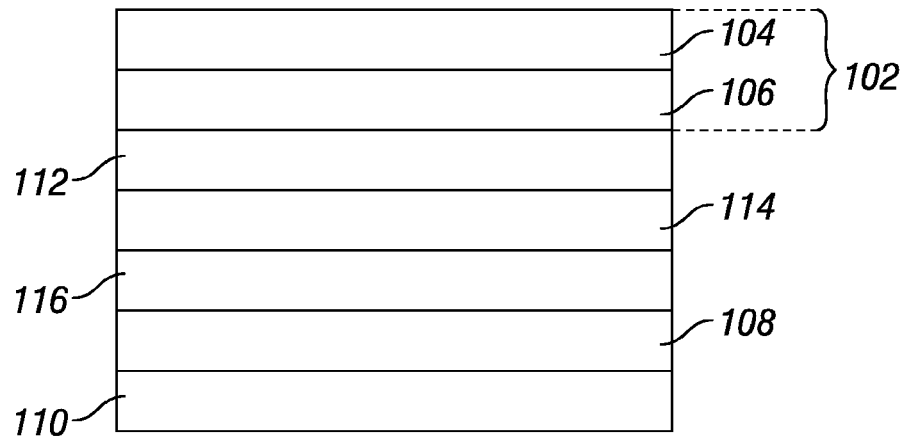
FIG. 4 is a cross-sectional view of a multi-ply structure in accordance with an embodiment of the present disclosure.
Figure 5:
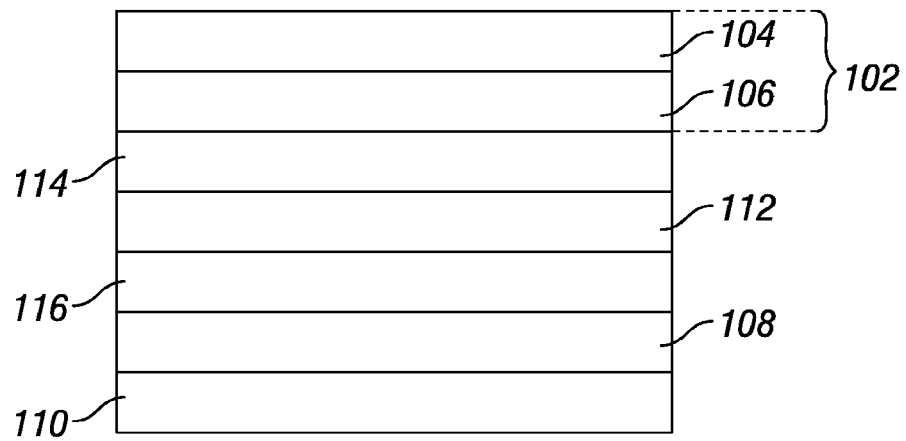
FIG. 5 is a cross-sectional view of a multi-ply structure in accordance with an embodiment of the present disclosure.

FIGS. 4 and 5 illustrate possible variations of the microwaved multi-ply structure 300 shown in FIG. 3. The microwaved multi-ply structures 400 and 500 both include an ink layer 112. In FIG. 4, the ink layer 112 is located between the barrier film 102 and the second adhesive layer 114. In this embodiment, the ink layer 112 is adjacent to the silicon oxide layer 106. In FIG. 5, the ink layer 112 is located between the second adhesive layer 114 and the first nylon layer 116. In both FIGS. 4 and 5, the first polyester layer 104 is the outermost layer of the multi-ply structures 400 and 500, respectively.

Figure 6:
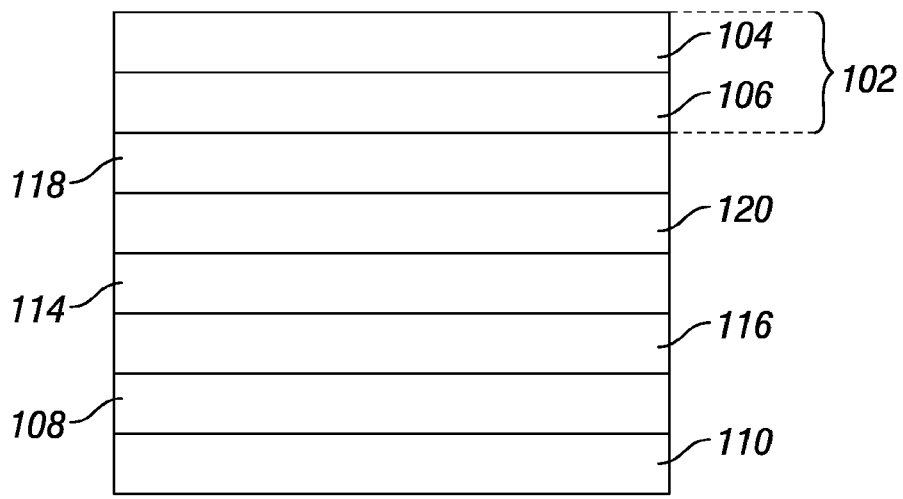
FIG. 6 is across-sectional view of a multi-ply structure in accordance with an embodiment of the present disclosure.

Another embodiment of the microwaved multi-ply structure is illustrated in FIG. 6. The microwaved multi-ply structure 600 is similar to the microwaved multi-ply structure 300 in FIG. 3, except that the microwaved multi-ply structure 600 further includes a third adhesive layer 118 and a second nylon layer 120. The third adhesive layer 118 is located between the barrier film 102 and the second nylon layer 120, whereas the second nylon layer 120 is located between the second and the third adhesive layers 114, 118. In this embodiment, the third adhesive layer 118 is adjacent to the silicon oxide layer 106 and the first polyester layer 104 is the outermost layer of the multi-ply structure 600.

Figure 7:
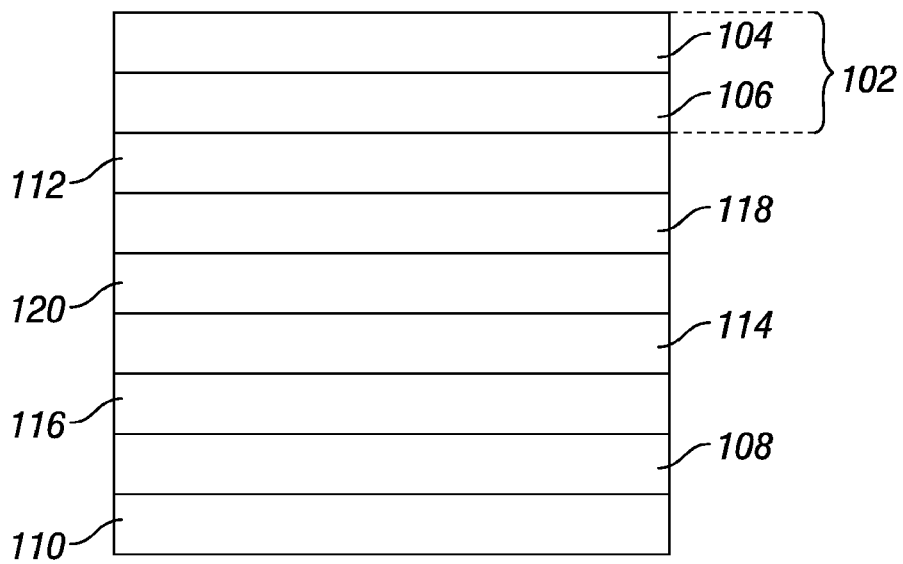
FIG. 7 is across-sectional view of a multi-ply structure in accordance with an embodiment of the present disclosure.
Figure 8:
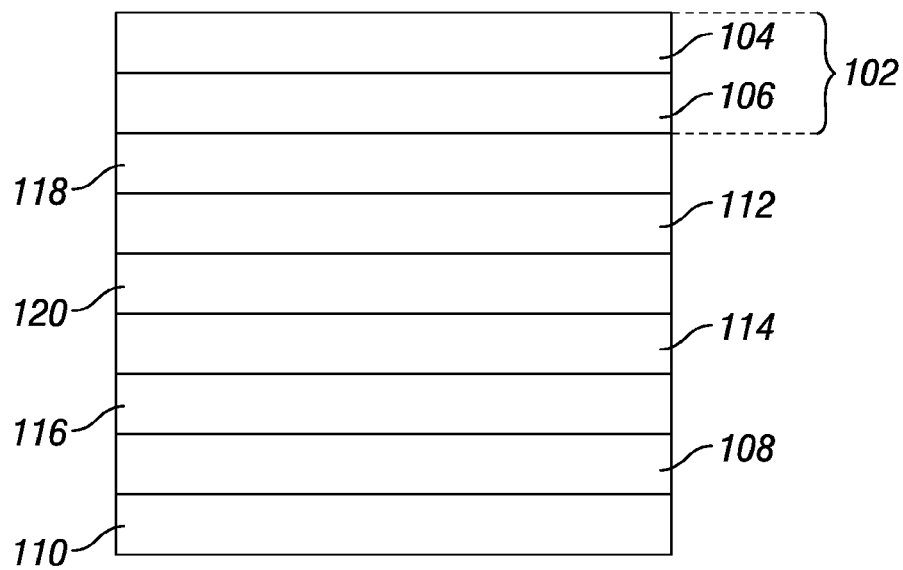
FIG. 8 is a cross-sectional view of a multi-ply structure in accordance with an embodiment of the present disclosure.

FIGS. 7 and 8 illustrate possible variations of the microwaved multi-ply structure 600 shown in FIG. 6. The microwaved multi-ply structures 700 and 800 both include an ink layer 112. In FIG. 7, the ink layer 112 is located between the barrier film 102 and the third adhesive layer 118. In this embodiment, the ink layer 112 is adjacent to the silicon oxide layer 106. In FIG. 8, the ink layer 112 is located between the third adhesive layer 118 and the second nylon layer 120. In both FIGS. 7 and 8, the first polyester layer 104 is the outermost layer of the multi-ply structures 700 and 800, respectively.

In some embodiments, each nylon layer of the one or more nylon layers has a thickness from about 48 gauge to about 100 gauge. In one embodiment, each of the one or more nylon layers has a different thickness. In another embodiment, each of the one or more nylon layers has equal thickness.

Figure 9:
FIG. 9 is a cross-sectional view of a multi-ply structure in accordance with an embodiment of the present disclosure.

In certain embodiments, the microwaved multi-ply structure comprises one or more additional polyester layers and one or more additional adhesive layers. For example, as illustrated in FIG. 9, the microwaved multi-ply structure 900, which is a variation of the microwaved multi-ply structure 100 in FIG. 1, further includes a second adhesive layer 114 and a second polyester layer 122. The second adhesive layer 114 is located between the barrier film 102 and the second polyester layer 122. In this embodiment, the second adhesive layer 114 is adjacent to the first and second polyester layers 104, 122 and the second polyester layer 122 is the outermost layer of the microwaved multi-ply structure 900. In another embodiment, as illustrated in FIG. 11, the second adhesive layer 114 is adjacent to the silicon oxide layer 106, rather than the first polyester layer 104.

Figure 10:
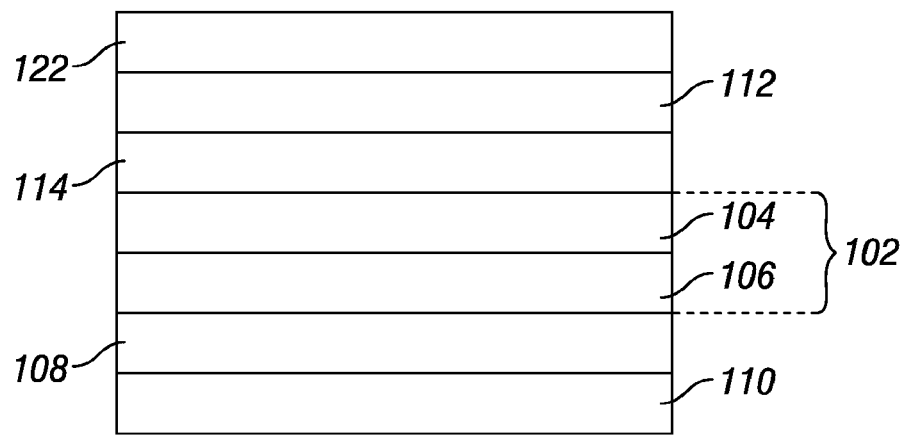
FIG. 10 is a cross-sectional view of a multi-ply structure in accordance with an embodiment of the present disclosure.
Figure 11:
FIG. 11 is a cross-sectional view of a multi-ply structure in accordance with an embodiment of the present disclosure.
Figure 12:
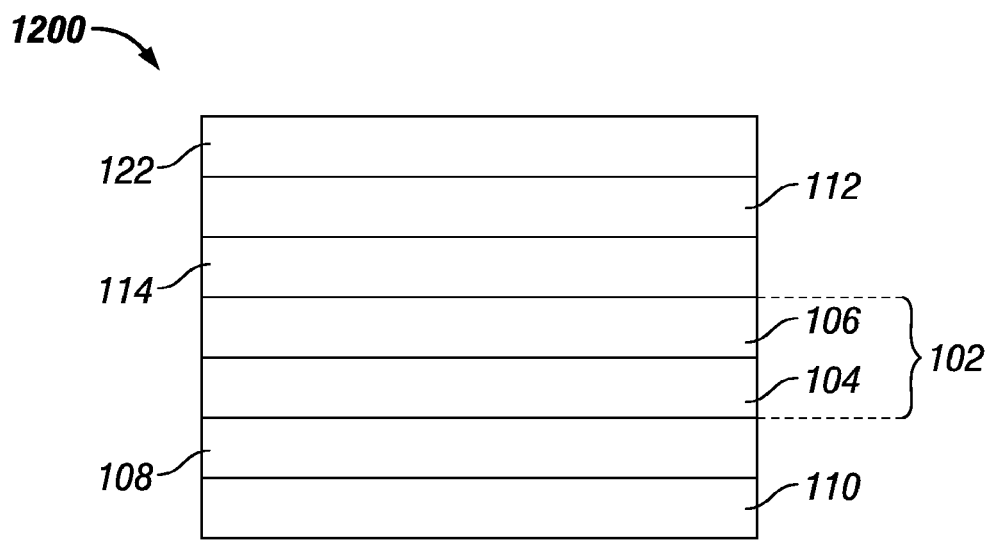
FIG. 12 is a cross-sectional view of a multi-ply structure in accordance with an embodiment of the present disclosure.

FIGS. 10 and 12 illustrate possible variations of the microwaved multi-ply structures 900 and 1100 shown in FIGS. 9 and 11, respectively. The microwaved multi-ply structures 1000 and 1200 both include an ink layer 112 that is located between the second polyester layer 122 and the second adhesive layer 114.

In embodiments, the one or more additional polyester layers are independent of the barrier film. That is, the one or more additional polyester layers are omitted from the barrier film. In some embodiments, each of the one or more additional polyester layers has a thickness from about 36 gauge to 120 gauge. In one embodiment, each of the one or more additional polyester layers has a different thickness. In another embodiment, each of the one or more additional polyester layers has equal thickness.

Figure 13:
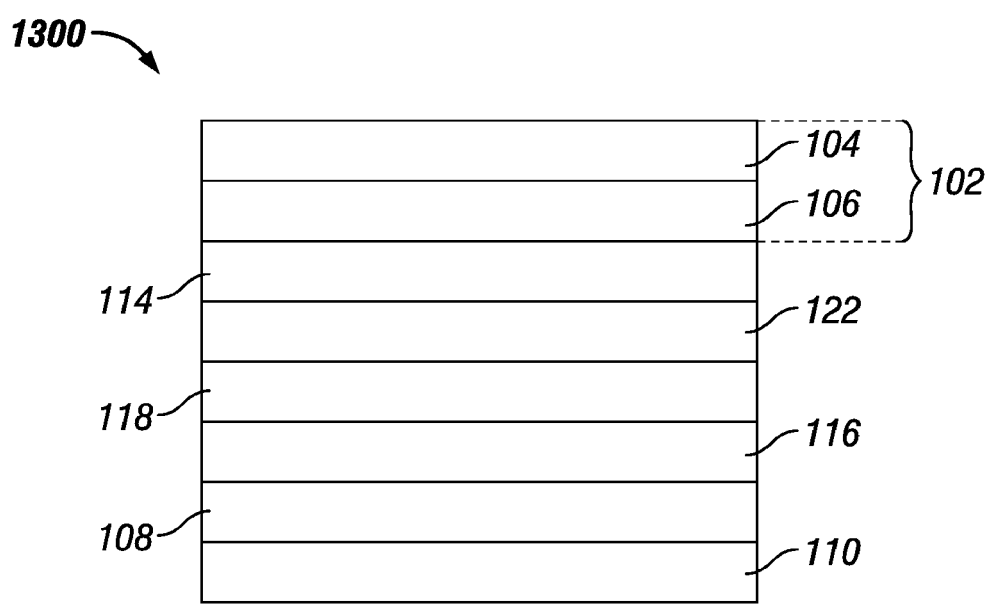
FIG. 13 is a cross-sectional view of a multi-ply structure in accordance with an embodiment of the present disclosure.

In some embodiments, the microwaved multi-ply structure comprises one or more nylon layers, one or more additional polyester layers, and one or more additional adhesive layers. For example, as illustrated in FIG. 13, the microwaved multi-ply structure 1300, which is a variation of the microwaved multi-ply structure 300 in FIG. 3, further includes a first nylon layer 116, a second polyester layer 122, and two additional adhesive layers 114, 118. The first nylon layer 116 is located between the first and third adhesive layers 108, 118, whereas the second polyester layer 122 is located between the second and the third adhesive layers 114, 118. The second adhesive layer 114 is located between the barrier film 102 and the second polyester layer 122, whereas the third adhesive layer 118 is located between the second polyester layer 122 and the first nylon layer 116. In this embodiment, the second adhesive layer 114 is adjacent to the silicon oxide layer 106 and the first polyester layer 104 is the outermost layer of the microwaved multi-ply structure 1300.

Figure 14:
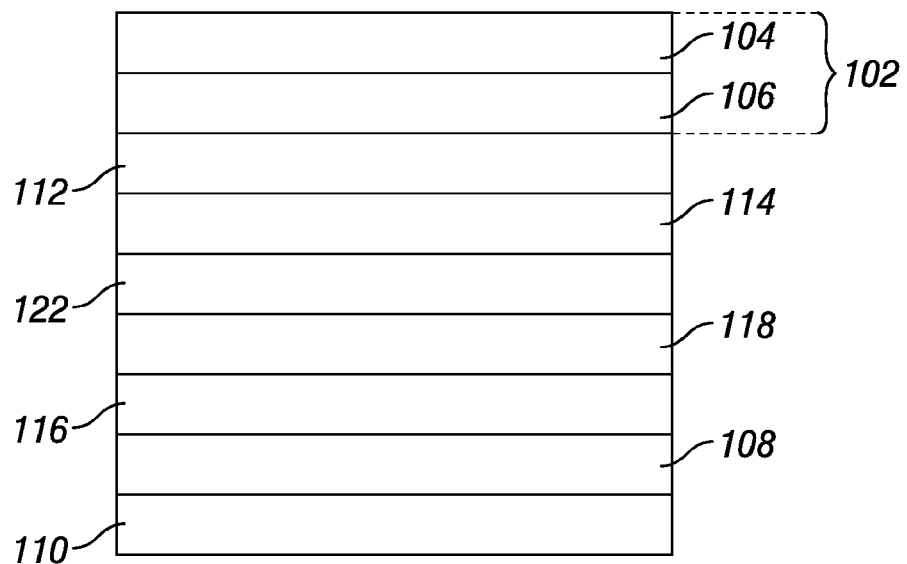
FIG. 14 is a cross-sectional view of a multi-ply structure in accordance with an embodiment of the present disclosure.
Figure 15:
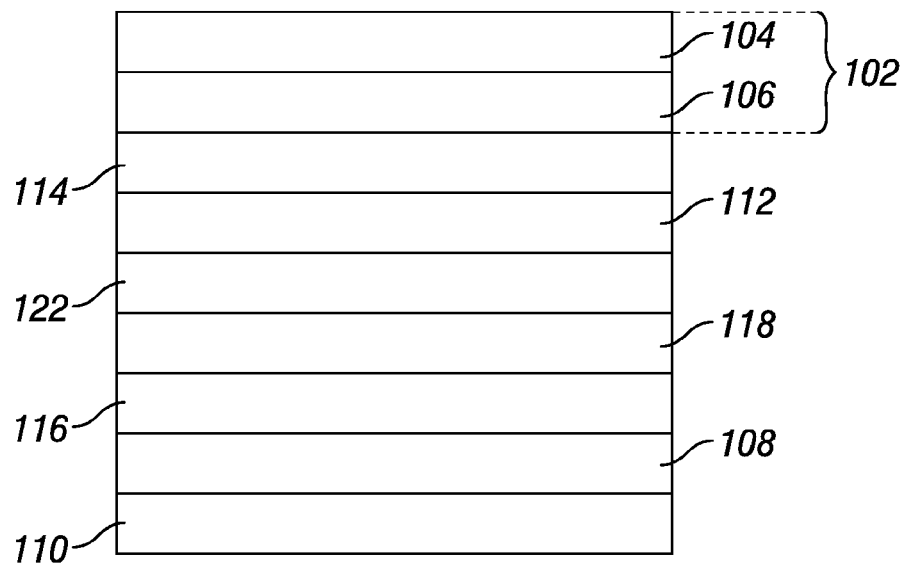
FIG. 15 is a cross-sectional view of a multi-ply structure in accordance with an embodiment of the present disclosure.

FIGS. 14 and 15 illustrate possible variations of the microwaved multi-ply structure 1300 shown in FIG. 13. The microwaved multi-ply structures 1400 and 1500 both include an ink layer 112. In FIG. 14, the ink layer 112 is located between the barrier film 102 and the second adhesive layer 114. In this embodiment, the ink layer 112 is adjacent to the silicon oxide layer 106. In FIG. 15, the ink layer 112 is located between the second adhesive layer 114 and the second polyester layer 122. In both FIGS. 14 and 15, the first polyester layer 104 is the outermost layer of the microwaved multi-ply structures 1400 and 1500, respectively.

Figure 16:
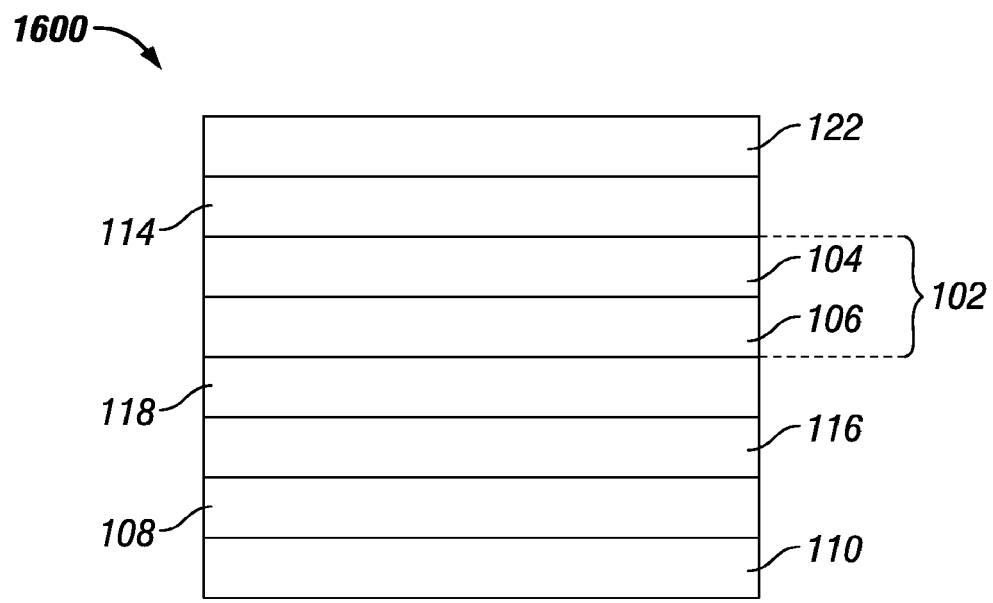
FIG. 16 is a cross-sectional view of a multi-ply structure in accordance with an embodiment of the present disclosure.

Another embodiment of the microwaved multi-ply structure is illustrated in FIG. 16. The microwaved multi-ply structure 1600 is similar to the microwaved multi-ply structure 900 in FIG. 9, except that the microwaved multi-ply structure 1600 further includes a third adhesive layer 118 and a first nylon layer 116. The third adhesive layer 118 is located between the barrier film 102 and the first nylon layer 116, whereas the first nylon layer 116 is located between the first and the third adhesive layers 108, 118. In this embodiment, the third adhesive layer 118 is adjacent to the silicon oxide layer 106 and the second polyester layer 122 is the outermost layer of the microwaved multi-ply structure 1600.

Figure 17:
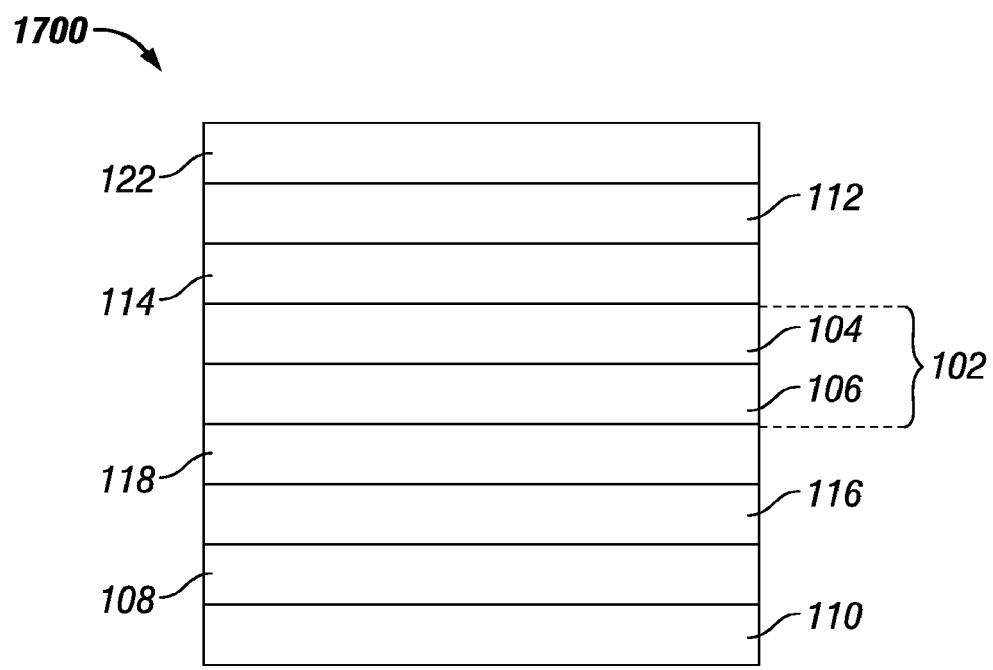
FIG. 17 is a cross-sectional view of a multi-ply structure in accordance with an embodiment of the present disclosure.
Figure 18:
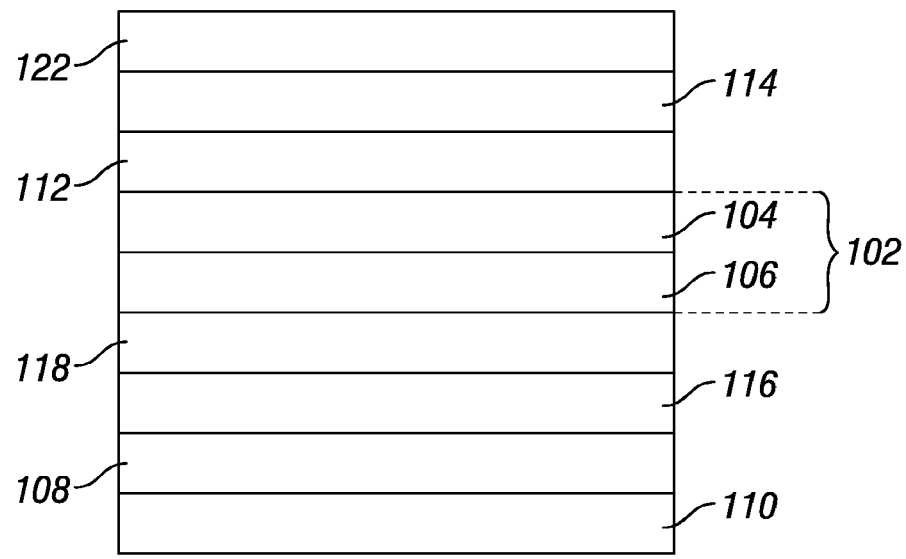
FIG. 18 is a cross-sectional view of a multi-ply structure in accordance with an embodiment of the present disclosure.

FIGS. 17 and 18 illustrate possible variations of the microwaved multi-ply structure 1600 shown in FIG. 16. The microwaved multi-ply structures 1700 and 1800 both include an ink layer 112. In FIG. 17, the ink layer 112 is located between the second polyester layer 122 and the second adhesive layer 114. In FIG. 18, the ink layer 112 is located between the second adhesive layer 114 and the barrier film 102. In this embodiment, the ink layer 112 is adjacent to the first polyester layer 104. In both FIGS. 17 and 18, the second polyester layer 122 is the outermost layer of the microwaved multi-ply structures 1700 and 1800, respectively.

Figure 19:
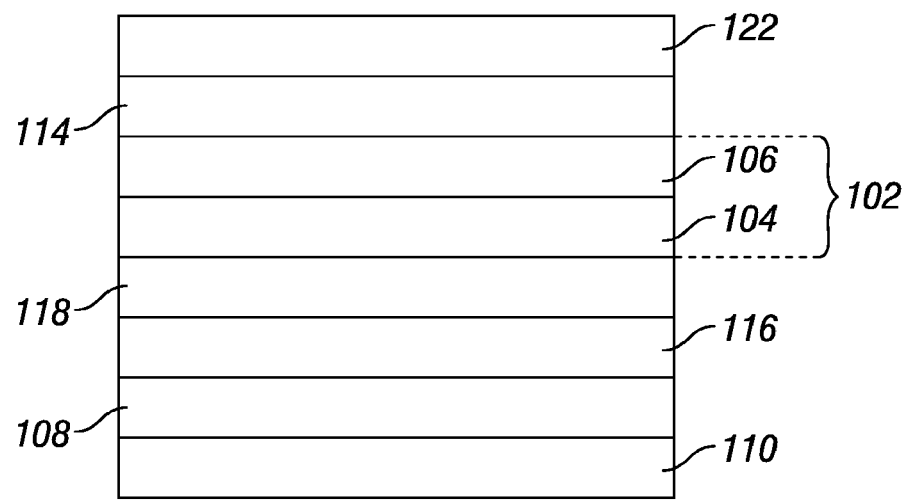
FIG. 19 is a cross-sectional view of a multi-ply structure in accordance with an embodiment of the present disclosure.

Another embodiment of the microwaved multi-ply structure is illustrated in FIG. 19. The microwaved multi-ply structure 1900 is similar to the microwaved multi-ply structure 1600 in FIG. 16, except that the second adhesive layer 114 is adjacent to the silicon oxide layer 106, rather than the first polyester layer 104.

Figure 20:
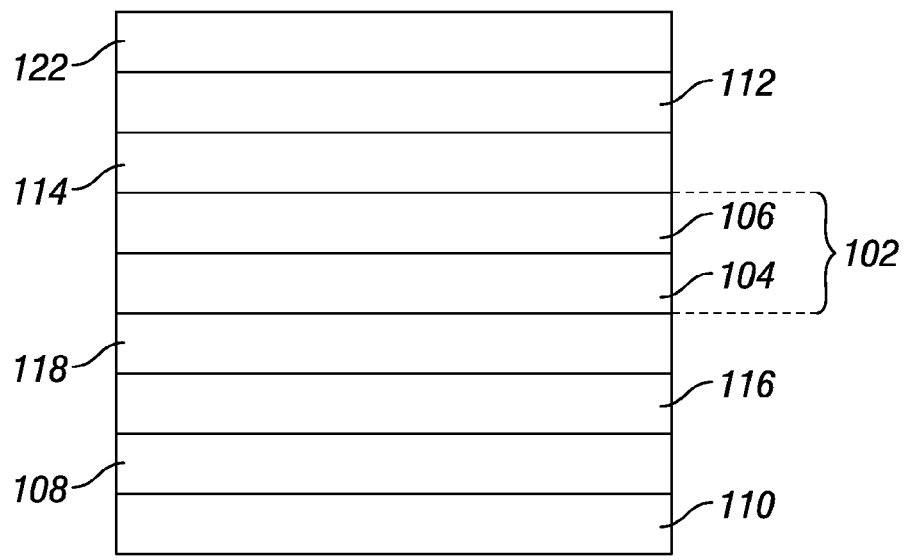
FIG. 20 is a cross-sectional view of a multi-ply structure in accordance with an embodiment of the present disclosure.
Figure 21:
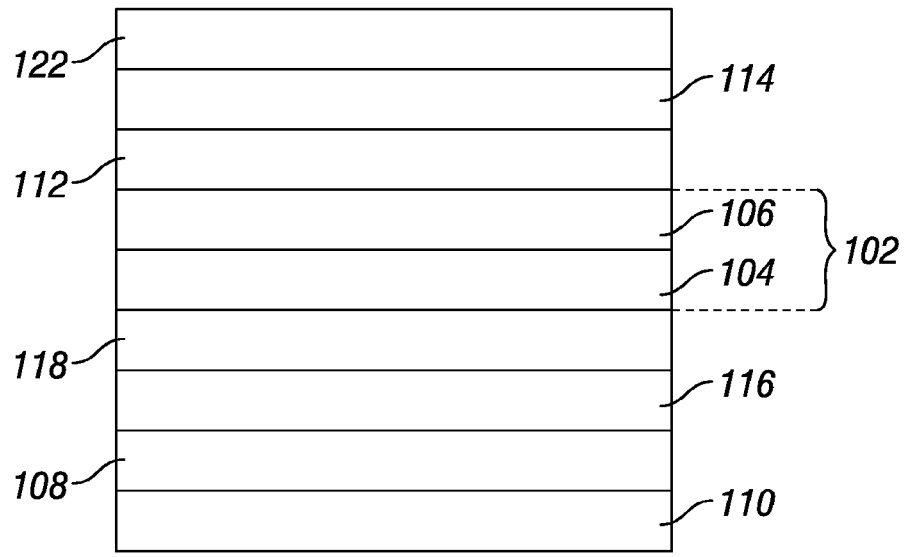
FIG. 21 is a cross-sectional view of a multi-ply structure in accordance with an embodiment of the present disclosure.

FIGS. 20 and 21 illustrate possible variations of the microwaved multi-ply structure 1900 shown in FIG. 19. The microwaved multi-ply structures 2000 and 2100 both include an ink layer 112. In FIG. 20, the ink layer 112 is located between the second polyester layer 122 and the second adhesive layer 114. In FIG. 18, the ink layer 112 is located between the second adhesive layer 114 and the barrier film 102. In this embodiment, the ink layer 112 is adjacent to the silicon oxide layer 106. In both FIGS. 20 and 21, the second polyester layer 122 is the outermost layer of the microwaved multi-ply structures 2000 and 2100, respectively.

Figure 22:
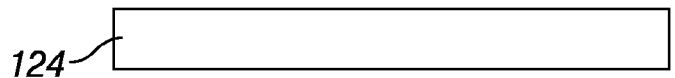
FIG. 22 is a cross-sectional view of a sealant film in accordance with an embodiment of the present disclosure.
Figure 23:
FIG. 23 is a cross-sectional view of a sealant film in accordance with an embodiment of the present disclosure.

The sealant film 110 in any of the foregoing microwaved multi-ply structures includes at least one polypropylene layer, which is adjacent to the first adhesive layer 108 of the microwaved multi-ply structures. For example, as illustrated in FIG. 22, the sealant film 110A includes a first polypropylene layer 124.

As used herein, a "polypropylene layer" is a layer that predominately comprises one or more polypropylenes. That is, a polypropylene layer comprises one or more polypropylene in an amount of at least 50% based on weight of the polypropylene layer. In one embodiment, the polypropylene layer comprises one or more polypropylenes in an amount of about 90% to about 100% based on weight of the polypropylene layer. In one embodiment, the polypropylene layer comprises one or more polypropylenes in an amount of about 95% to about 100% based on weight of the polypropylene layer.

The sealant film provided herein may be formed by any of the conventional processes for making sealant films, including blown extrusion, cast extrusion, or the like. It should be noted that any layer of the sealant film described herein may be formed using a film line with single or multiple extruders.

In certain embodiments, the multi-layered sealant film has a thickness from about 1 mil to about 8 mil. In one embodiment, the multi-layered sealant film has a thickness from about 2 mil to about 5 mil. In other embodiments, the multi-layered sealant film has a thickness of 1 mil, 1.5 mil, 2 mil, 2.5 mil, 3 mil, 3.5 mil, 4 mil, 4.5 mil, 5 mil, 5.5 mil, 6 mil, 6.5 mil, 7 mil, 7.5 mil, or 8 mil. In other embodiments, the multi-layered sealant film of this disclosure also may have a thickness between any of these recited thickness values.

In some embodiments, the sealant film 110 may include additional layers, such as additional polypropylene layers, a nylon layer, an easy-peel layer, or any combination thereof. Examples of these sealant films are illustrated in FIGS. 23-28 and may be the sealant film of any of the foregoing microwaved multi-ply structures. It is also contemplated that any of these additional layers may be omitted from the sealant film.

In some embodiments, the sealant film does not comprise a nylon layer. In other embodiments, the sealant comprises one or more nylon layers. For example, in FIG. 23, the sealant film 110B includes two polypropylene layers 124, 128, a nylon layer 126, and two tie layers 130, 132. The nylon layer 126 is located between the first and second polypropylene layers 124, 128, where the first tie layer 130 is located between the first polypropylene layer 124 and the nylon layer 126 and the second tie layer 132 is located between the nylon layer 126 and the second polypropylene layer 128. In this embodiment, the second polypropylene layer 128 is the innermost layer of the microwaved multi-ply structure.

As used herein, a "nylon layer" of the sealant film is a layer that predominately comprises one or more nylons. That is, a nylon layer comprises one or more nylons in an amount of at least 50% based on weight of the nylon layer. In one embodiment, the nylon layer comprises one or more nylons in an amount of about 80% to about 100% based on weight of the nylon layer. In another embodiment, the nylon layer comprises one or more nylons in an amount of about 95% to about 100% based on weight of the nylon layer. Non-limiting examples of suitable nylons do not include biaxially oriented nylons. Non-limiting examples of suitable nylon materials include polyamides, such as nylon 6, nylon 6,66, and nylon 66, and the like, and combinations thereof.

As used herein "innermost layer" means the last layer that is viewed from the outside of a reverse laminated structure and will typically be a layer that is in proximate to or in contact with product contained in a package made with such a structure (e.g., pouch) or in a package having a portion made with such structure (e.g., lidding).

As used herein, a tie layer is an extruded resin layer that aids in adhering or bonding dissimilar layers of a co-extruded film together. In some embodiments, one or more tie layers are included in the sealant film to adhere dissimilar layers of the sealant film together. For purposes of this disclosure, even though a tie layer aids in adhering and bonding, it is not an adhesive layer as defined herein.

Non-limiting examples of suitable tie layer materials include anhydride-modified polyolefins (e.g., anhydride-modified polypropylene or anhydride-modified polyethylene), modified ethylene vinyl acetate, anhydride-modified ethylene acrylate, acid/acrylate-modified ethylene vinyl acetate, anhydride-modified ethylene vinyl acetate, anhydride-modified ethylene methyl acrylate, ethylene methyl acrylate (EMA), and combinations thereof, and any of the foregoing materials in combination with polyolefins, such as polypropylene.

The type of materials in a tie layer is based, at least in part, on the materials of the opposing layers of the film being bonded via the tie layer. For example, where a first tie layer is used to bond a first polypropylene layer and a nylon layer, the first tie layer may comprise anhydride-modified polypropylene, and where a second tie layer is used to bond a second polypropylene and the nylon layer, the second tie layer may comprise anhydride-modified polypropylene.

Figure 24:
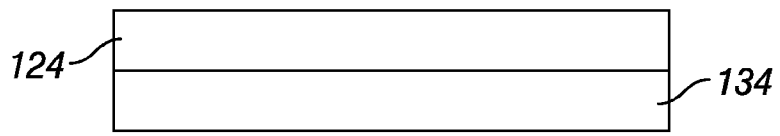
FIG. 24 is a cross-sectional view of a sealant film in accordance with an embodiment of the present disclosure.

In FIG. 24, the sealant film 110C includes a first polypropylene layer 124 and an easy-peel layer 134. In this embodiment, the easy-peel layer 134 is the innermost layer of the multi-ply structure. In one embodiment, the easy-peel layer comprises a blend of a polypropylene, a polyethylene, an antiblock agent (e.g., diatomaceous earth), and a slip agent (e.g., erucamide). In another embodiment, the easy-peel layer comprises a blend of a polypropylene, an ethylene methyl acrylate (EMA), an antiblock agent (e.g., diatomaceous earth), and a slip agent (e.g., erucamide).

Figure 25:
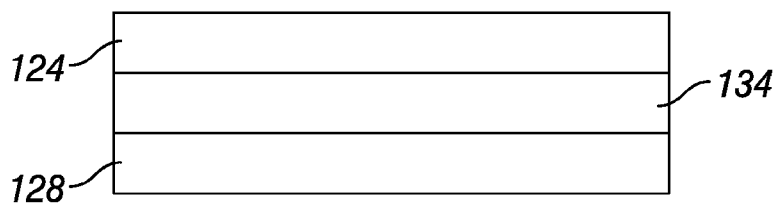
FIG. 25 is a cross-sectional view of a sealant film in accordance with an embodiment of the present disclosure.

Another embodiment of the sealant film is illustrated in FIG. 25. The sealant film 110D includes two polypropylene layers 124, 128 and an easy-peel layer 134. In this embodiment, the easy-peel layer 134 located between the first and the second polypropylene layers 124, 128 and the second polypropylene layer 128 is the innermost layer of the microwaved multi-ply structure.

Figure 26:
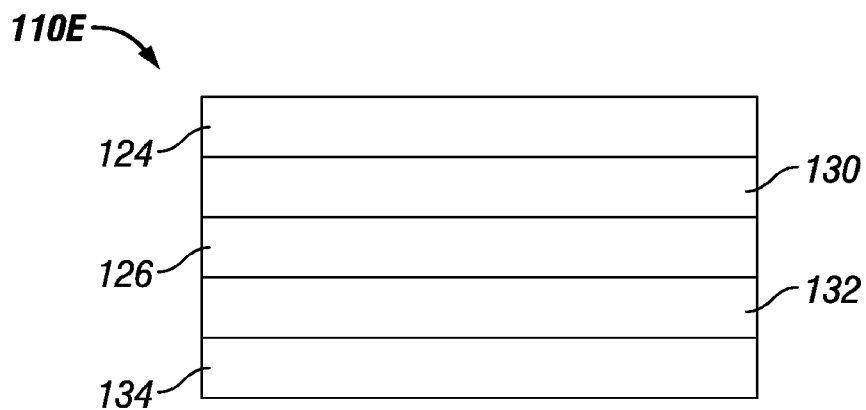
FIG. 26 is a cross-sectional view of a sealant film in accordance with an embodiment of the present disclosure.

In FIG. 26, the sealant film 110E includes a first polypropylene layer 124, a nylon layer 126, two ties layers 130, 132 and an easy-peel layer 134. The nylon layer 126 is located between the first and second polypropylene layers 124, 128, where the first tie layer 130 is located between the first polypropylene layer 124 and the nylon layer 126 and the second tie layer 132 is located between the nylon layer 126 and the easy-peel layer 134. In this embodiment, the easy-peel layer 134 is the innermost layer of the microwaved multi-ply structure.

Figure 27:
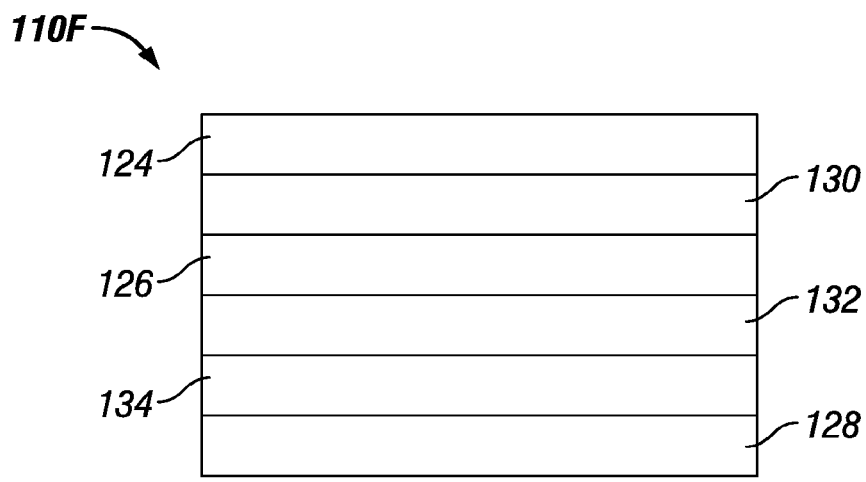
FIG. 27 is a cross-sectional view of a sealant film in accordance with an embodiment of the present disclosure.
Figure 28:
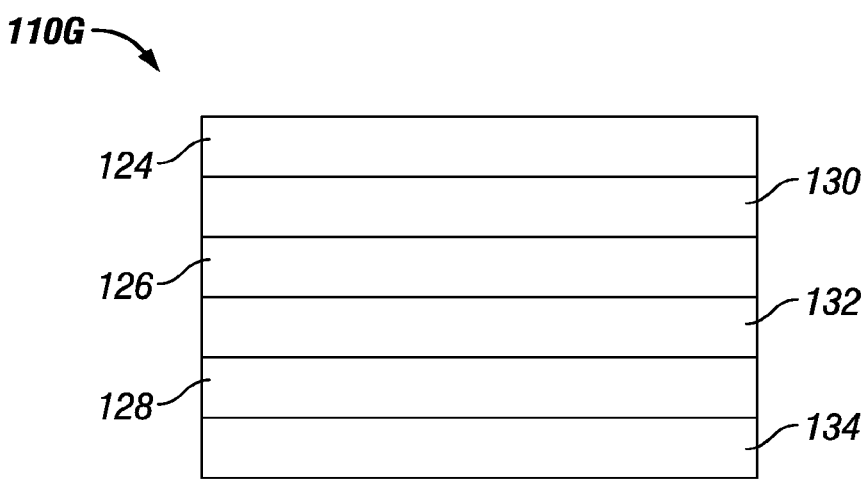
FIG. 28 is a cross-sectional view of a sealant film in accordance with an embodiment of the present disclosure.

FIGS. 27 and 28 illustrate possible variations of the sealant film 110E shown in FIG. 26. The sealant films 110F and 110G both include a second polypropylene layer 128. In FIG. 27, the second polypropylene layer 128 is adjacent to the easy-peel layer 134 and is the innermost layer of the microwaved multi-ply structure. In FIG. 28, the second polypropylene layer 128 is located between the second tie layer 132 and the easy-peel layer 134. In this embodiment, the easy-peel layer 134 is in the innermost layer of the microwaved multi-ply structure.

In certain embodiments where the sealant film does not comprise an easy-peel layer, the sealant film does not comprise polyethylene.

In any of the foregoing sealant film embodiments, the sealant film, in some embodiments, does not comprise solvent-based, water-based, or solvent-less adhesives. In other embodiments, the sealant film of any of the foregoing sealant film embodiments is substantially free of adhesive, i.e., solvent-based adhesives, water-based adhesives, and/or solvent-less adhesives. As used herein "substantially free" means that the total amount of adhesive present within the sealant film is less than about 1% by weight of the multi-ply structure.

The multi-ply structures provided herein may be formed by any of the conventional processes for making multi-ply structures, including adhesive lamination, extrusion lamination, blown film or cast film, extrusion coating, and combinations thereof. In certain embodiments, the barrier film and/or the sealant film is formed off-line with respect to the forming of the multi-ply structure. That is, the barrier film and/or the sealant film can be formed in separate and independent preliminary processes with respect to the process used to form the multi-ply structure. In embodiments where the multi-ply structure includes an ink layer, the ink layer is printed onto a formed layer or film during the fabrication of the multi-ply structure. In one embodiment, the barrier film is formed off-line in which the first polyester layer is formed through a cast film process with an in-line tenter frame and then the silicon oxide layer is deposited via chemical vapor deposition onto the first polyester layer, and the sealant film is formed off-line via blown film or cast film process, after which the barrier film, the sealant film, and any other additional layer(s), such as nylon layer(s) and/or additional polyester layer(s) are formed into the multi-ply structure via adhesive lamination.

Packages

The multi-ply structures described herein may be used in a variety of packaging applications, such as in the formation of microwaved packages. In embodiments, the present multi-ply structures, prior to being microwaved, may be formed in-line or off-line with the forming of a package. In certain embodiments, a roll of film comprising the multi-ply structures, prior to being microwaved, described herein may be used to form a package. Once the package is formed, it is filled with product, sealed, and then microwaved in a pressurized vessel to form a microwaved package. In some embodiments, the pressurized vessel includes a fluid medium. In one embodiment, the fluid medium is a liquid and the package and the product disposed into the package is at least partially immersed in the liquid. In another embodiment, the fluid medium is steam.

As used herein, a "conventional microwaved package" is a package that includes a conventional microwaved multi-ply structure as defined herein. That is, a conventional microwaved package does not include a structure that includes a combination of at least a sealant film, a first adhesive layer, and a barrier film in which the barrier film comprises a first polyester and a silicon oxide layer.

As used herein, a "conventional multi-ply structure" of a conventional microwaved package is a conventional microwaved multi-ply structure as defined herein.

As used herein, a "comparative package" is simply a non-microwaved sample of the subject microwaved package. That is, the comparative package is the same package as the microwaved package except that the comparative package has not been microwaved (i.e., the comparative package has not undergone a MATS process). In some instances, the comparative package has not undergone any thermal retort process, whereas in other instances, the comparative package has undergone a conventional thermal retort process.

In embodiments, the microwaved packages are sterilized during the MATS process. In embodiments where the microwaved packages contain a product disposed within the package, the product is also sterilized. Additionally when the package contains a food or a drink product, the product is also pasteurized during the MATS process.

In one embodiment, the microwaved package includes a multi-ply structure that defines an interior space of the package and a product disposed within the interior space. The multi-ply structure comprises a barrier film, which includes a first polyester layer and a silicon oxide layer, a first adhesive layer, and a sealant film, wherein the adhesive layer is located between the barrier film and the sealant film.

Non-limiting examples of suitable products include food products such as soups, ready meals, rice, meats, baby food, wet pet food, pasta, vegetable(s), and the like, drink products such as beverages and the like, and pharmaceutical products.

In some embodiments, the package is in the form of a pouch. Exemplary pouches include stand-up pouches, four-side seal pouches, pillow pouches, c-fold pouches, step-cut, pinch bottom pouches, and chevron pouches. It should be noted that any of these exemplary pouches may include one or more fitments (e.g., one or more spouts).

Figure 29:
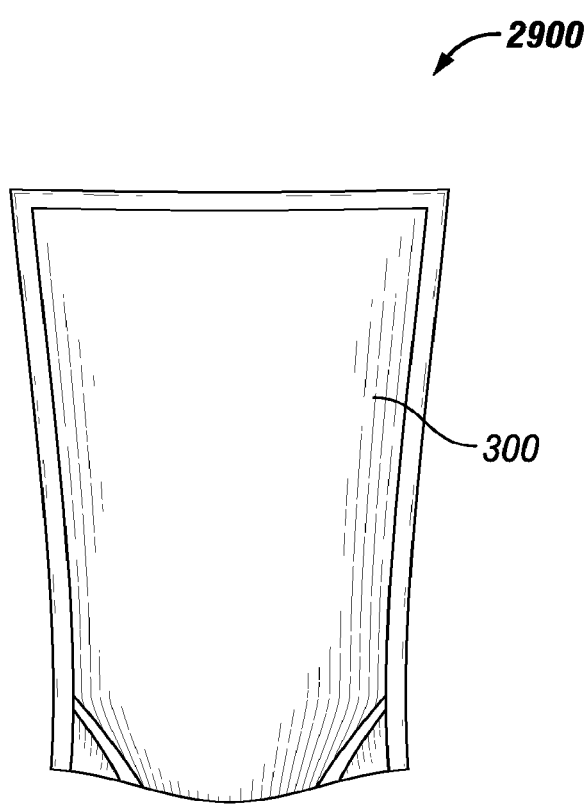
FIG. 29 is a perspective view of a package, which is in the form of an exemplary stand-up pouch, in accordance with an embodiment of the present disclosure.

One embodiment of the microwaved package is illustrated in FIG. 29. In FIG. 29, the microwaved package 2900 is an exemplary stand-up pouch. The microwaved package 2900 is formed from the multi-ply structure 300 of FIG. 3 in which the multi-ply structure 300 defines an interior space of the microwaved package 2900 and product is disposed within such space.

The present microwaved packages may be formed from a multi-ply structure described herein, where the multi-ply structure is sealed to itself or to another film to form a pouch by forming heat seals about the periphery of the pouch body. The other film may be the same or different than the multi-ply structure.

In another embodiment, the microwaved package includes a container body having a rim in which the container body defines an interior space of the package, product disposed within the interior space, and a multi-ply structure affixed to the rim. The multi-ply structure includes a barrier film comprising a first polyester layer and a silicon oxide layer, a first adhesive layer, and a sealant film, wherein the first adhesive layer is located between the barrier film and the sealant film. In certain embodiments, the container body is rigid or semi-rigid.

In some embodiments, the container body is a rigid or semi-rigid tray or cup. In another embodiment, the container body is a flexible formed web.

Figure 30:
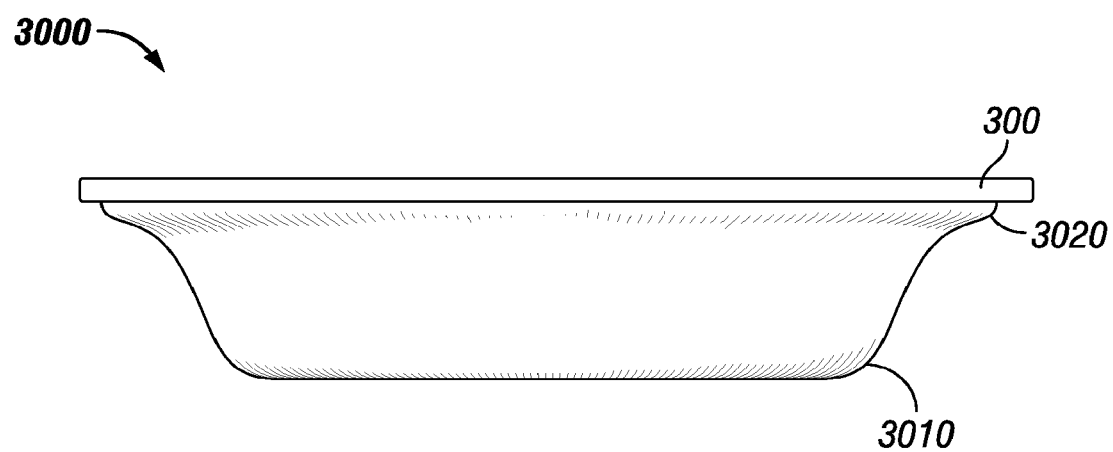
FIG. 30 is a side elevation view of a package including a lidding formed from a multi-ply structure in accordance with an embodiment of the present disclosure.

FIG. 30 shows an exemplary package 3000 that includes a rigid or semi-rigid container body 3010 having a rim (or flange) 3020, and the multi-ply structure 300 of FIG. 3. The multi-ply structure 300 is attached to the rim 3020. For example, the multi-ply structure 300 may be heat sealed about the rim 3020 of the container body 3010.

The container body may be made of any suitable material, such as injection molded or thermoformed polypropylene, polyethylene, and the like; however, the composition of the container base and sealant film of the multi-ply structure should be compatible with one another so that the heat sealing creates a sealing interface between the container body and the multi-ply structure. In some embodiments, it may be desirable that the multi-ply structure includes a pull tab that extends beyond the rim of the container body to allow a user to more readily grasp and peel the multi-ply structure to open the package.

In certain embodiments, the microwaved package includes one or more fitments. In other embodiments, the microwaved package includes at least one pull tab. In one embodiment, the microwaved package includes one or more fitments and at least one pull tab.

In some embodiments, the microwaved package does not comprise a microwave energy interactive material, such as those described in International Publication No. WO 2012/148895 (e.g., foil patch, patterned foil, a susceptor, or combinations thereof).

Methods of Sterilization

The present multi-ply structures and the packages made therefrom are suitable for use in sterilization processes. In particular, the multi-ply structures and packages of the present disclosure are sterilized via microwaved assisted thermal sterilization (MATS), such as those described herein and in U.S. Pat. Nos. 5,436,432, 5,750,966, 7,119,313, 7,230,217, 9,066,376, 9,179,505, and 9,271,338, and in International Publication Nos. WO 2016/044571, WO 2016/100539, and WO 2015/171763, all of which are incorporated herein by reference.

In some embodiments, the method for sterilization includes feeding a package, which the package has product disposed within an interior space thereof, into a pressurized vessel, and exposing the package and the product within the pressurized vessel to microwave energy, where the package and the product are exposed to one or more cycles of microwave energy. The package includes a multi-ply structure as described herein. For example, in one embodiment, the multi-ply structure is the multi-ply structure illustrated 300 in FIG. 3, whereas in other embodiments, the multi-ply structure is the multi-ply structure 1300 as illustrated in FIG. 13.

As used herein, "one or more cycles" means one or more separate intervals.

In some embodiments, the pressurized vessel includes a fluid medium. In one embodiment, the pressurized vessel includes a liquid and the multi-ply structure or the package is at least partially immersed in the liquid.

In some embodiments, during each cycle, the package and the product are exposed to about 5 kW to about 40 kW of microwave energy. In one embodiment, during each cycle, the package and the product are exposed to 10 kW to about 30 kW of microwave energy.

In embodiments, the product is also pasteurized during the sterilization process.

Figure 31:
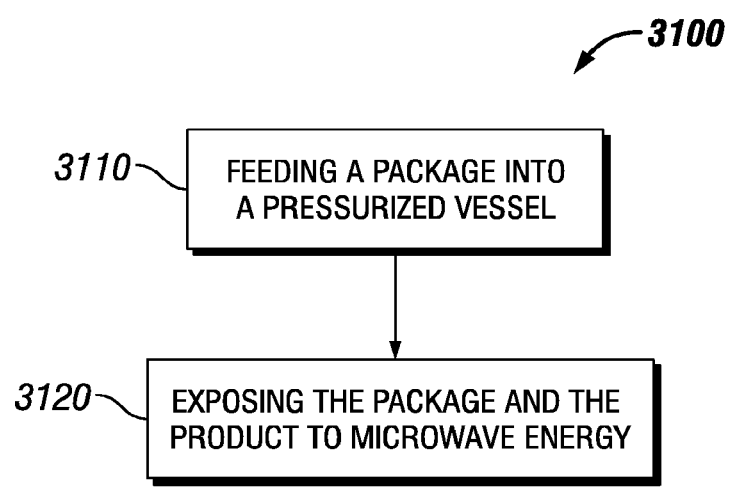
FIG. 31 is a process flow diagram that illustrates a method for sterilization in accordance with an embodiment of the present disclosure.

One exemplary method of sterilization is illustrated in FIG. 31. The method 3100 includes the method for sterilization includes feeding a package having product disposed therein into a pressurized vessel 3110 and exposing the package and the product to microwave energy 3120.

The present teachings may be further understood with reference to the following non-limiting examples.

EXAMPLES

Various packages were prepared which included a container body, salt water which served as the product, and a multi-ply structure sealed to the container body. For each package, the container body was in the form of a rectangle tray and filled with salt water, and the multi-ply structure was heat sealed to the container body to form a sealed package.

$SiO_x$ Packages: The multi-ply structure for each of these exemplary packages includes a barrier film, a nylon layer, two adhesive layers, and a sealant film, as illustrated in FIG. 3. The below table illustrates the compositional make-up of each exemplary multi-ply structure:

| Film/Layer | Material |
|---|---|
| Barrier Film ($SiO_X$ PET) | 48 gauge SiOx polyethylene terephthalate (PET) |
| Adhesive Layer | Solvent-based polyurethane adhesive |
| Nylon Layer | 60 gauge biaxially oriented nylon (BON) |
| Adhesive Layer | Solvent-based polyurethane adhesive |
| Sealant Film | 2.75 mil white peelable polypropylene; or 2.75 mil polypropylene |

Conventional Packages (Control): The multi-ply structure for each conventional package is similar to the SiOx packages, except that the barrier film in these packages is 48 gauge $AlO_x$ PET.

Example 1

Ten $SiO_x$ package samples and ten conventional package samples were made according to the below manufacturing parameters. Two of the $SiO_x$ package samples served as comparative package samples, which did not undergo a MATS process, whereas the remaining eight packages underwent microwave assisted thermal sterilization (MATS) processes-two packages for each MATS process condition indicated below. Similarly, two of the conventional package samples served as comparative conventional package samples, which did not undergo a MATS process, whereas the remaining eight packages underwent separate MATS processes-two packages for each MATS process condition indicated below.

| MANUFACTURING PARAMETERS | | | | |
|---|---|---|---|---|
| FILL VOLUME | SEAL TEMP | SEAL PRESSURE | VACUUM | DWELL TIME |
| 300 g | 380° F. | 4 bar | 500 mbar | 2 seconds |

Except for the comparative samples, each set of two samples underwent one of the MATS processes indicated in the below table:

| MATS PROCESS CONDITION | MATS PROCESSING PROCESSING CONDITIONS | | |
|---|---|---|---|
| | PRE-HEAT | HEATING/MW | COOLING |
| 1 | 38° C. \| 60 psi \| 5 min | 121.7° C. \| 60 psi \| 4 passes @ 20 kW\| carrier speed 3 in/sec \| 30 sec dwell b/t passes \| 10 min hold | 26° C. \| 60 psi \| 15 min |
| 2 | 38° C. \| 50 psi \| 5 min | 121.7° C. \| 50 psi \| 4 passes @ 20 kW\| carrier speed 3 in/sec \| 30 sec dwell b/t passes \| 10 min hold | 26° C. \| 50 psi \| 15 min |
| 3 | 38° C. \| 60 psi \| 5 min | 121.7° C. \| 60 psi \| 6 passes @ 20 kW \| carrier speed 3 in/sec \| 30 sec dwell b/t passes \| 10 min hold | 26° C. \| 60 psi \| 15 min |
| 4 | 65° C. \| 60 psi \| 5 min | 121.7° C. 60 psi \| 6 passes @ 10 kW \| carrier speed 3 in/sec \| 30 sec dwell b/t passes \| 10 min hold | 26° C. \| 60 psi \| 15 min |

After MATS, the moisture vapor transmission rate (MVTR) and oxygen transmission rate (OTR) were measured. The MVTR was measured for each sample according to ASTM F1249 at 38° C. and 90% relative humidity, and then the average MVTR of the two samples of each process condition, i.e., Conditions 1-4, and the average MVTR of each set of comparative package samples, which did not undergo a MATS process condition, were calculated. The OTR was measured for each sample according to ASTM D3985 with 100% $O_2$ at 30° C. and 70% relative humidity, and then the average OTR of the two samples of each process condition and the average OTR of each set of comparative package samples were calculated. The below table summarizes the average MVTR and the average OTR for each sample set.

| POST-MATS BARRIER TEST RESULTS | | | | |
|---|---|---|---|---|
| | Conventional Packages (Control) | | SiOx Packages | |
| SAMPLE SET | MATS PROCESS CONDITION | OTR 100% O2/ 30° C./ 70% RH cc/100 in 2/24 hr (Avg) | MVTR 38° C./ 90% RH g/100 in 2/24 hr (Avg) | OTR 100% O2/ 30° C./ 70% RH cc/100 in 2/24 hr (Avg) | MVTR 38° C./ 90% RH g/100 in 2/24 hr (Avg) |
| 1 | 1 | 0.0753 | 0.1101 | 0.0076 | 0.0234 |
| 2 | 2 | 0.0812 | 0.1151 | 0.0084 | 0.0227 |
| 3 | 3 | 0.0583 | 0.109 | 0.01 | 0.0261 |
| 4 | 4 | 0.0258 | 0.0925 | 0.0092 | 0.0185 |
| Comparative | NONE | 0.0022 | 0.025 | 0.0028 | 0.0076 |

As can be seen from the above table, the exemplary $SiO_x$ packages have lower OTRs as compared to the control packages. Specifically, the exemplary $SiO_x$ packages have OTRs up to 10 times lower at certain MATS processing conditions compared to the control packages. Also, the exemplary $SiO_x$ packages have lower MVTRs as compared to the control packages. Moreover, the OTR and MVTR of the $SiO_x$ packages were maintained over a broader range of MATS processing conditions as compared to the control packages.

Example 2

Four $SiO_x$ package samples were made according to the $SiO_x$ packages in example 1 above. Two $SiO_x$ package samples underwent a first retort process, R1, and two SiO$_x$ package samples underwent a second retort process, R2. The process parameters for each retort process was as follows:

| Retort Process | Retort Process Conditions |
|---|---|
| R1 | 250° F.| 30 psi | 60 min |
| R2 | 265° F.| 35 psi | 30 min |

After the conventional thermal retort process, the MVTR and OTR were measured. The MVTR was measured for each sample according to ASTM F1249 at 38° C. and 90% relative humidity, and the average MVTR of the two samples of each process condition was calculated. The OTR was measured for each sample according to ASTM D3985 with 100% O$_2$ at 23° C. and 0% relative humidity, and the average OTR of the two samples of each process condition was calculated. The below table summarizes the average MVTR and OTR of the samples for retort process.

| Retort Process | MVTR 38° C./90% RH g/100 in²/24 hr Avg | OTR 100% O$_2$/23° C./0% RH cc/100 in²/24 hr Avg |
|---|---|---|
| R1 | 0.0519 | 0.0037 |
| R2 | 0.1178 | 0.0157 |

As can be seen from the above table, it was unexpectedly discovered that the MVTR of samples R1 and R2 were higher than the MVTR of the samples that underwent a MATS process in example 1. That is, the MVTR of the MATS samples had a lower MVTR compared to samples R1 and R2, which underwent conventional thermal retort. Additionally, it was also surprising that the OTR of sample R2 was higher than the OTR of the MATS samples in example 1. Thus, this data illustrates that a barrier film that includes SiOx PET results in a post-MATS package (microwaved package) having barrier properties, at least with respect to MVTR, that are generally superior to those of the post-conventional thermal retort packages.

The following numbered embodiments, aspects, and features of the disclosure are provided, with an emphasis on the ability to combine the various features which may disclosed only in certain embodiments, into other disclosed embodiments, as the context and technical reason allow.

EMBODIMENTS

Clause 1. A multi-ply structure comprising:
a barrier film comprising a first polyester layer and a silicon oxide layer;
a first adhesive layer, and
a sealant film,
wherein the first adhesive layer is located between the barrier film and the sealant film, and
wherein the multi-ply structure has been microwaved in a pressurized vessel.

Clause 2. The multi-ply structure of clause 1, wherein the multi-ply structure is flexible.

Clause 3. The multi-ply structure of clause 1 or 2, wherein the multi-ply structure is substantially polymeric.

Clause 4. The multi-ply structure of any one of clauses 1 to 3, wherein the pressurized vessel comprises a liquid and the multi-ply structure is at least partially immersed in the liquid.

Clause 5. The multi-ply structure of any one of clauses 1 to 4, wherein the microwaved multi-ply structure is sterilized.

Clause 6. The multi-ply structure of any one of clauses 1 to 5, wherein the multi-ply structure does not comprise a microwave energy interactive material.

Clause 7. The multi-ply structure of any one of clauses 1 to 6, wherein the microwaved multi-ply structure has a moisture vapor transmission rate from about 0.005 g/100 in²/day to about 0.06 g/100 in²/day.

Clause 8. The multi-ply structure of any one of clauses 1 to 6, wherein the microwaved multi-ply structure has a moisture vapor transmission rate that is about 0% to about 1,100% greater than a comparative moisture vapor transmission rate of a comparative multi-ply structure that has not been microwaved in the pressurized vessel.

Clause 9. The multi-ply structure of any one of clauses 1 to 6, wherein the microwaved multi-ply structure has a moisture vapor transmission rate that is about 50% to about 99% lower than a comparative moisture vapor transmission rate of a conventional microwaved multi-ply structure.

Clause 10. The multi-ply structure of any one of clauses 1 to 9, wherein the microwaved multi-ply structure has an oxygen transmission rate from about 0.001 cc/100 in²/day to about 0.03 cc/100 in²/day.

Clause 11. The multi-ply structure of any one of clauses 1 to 9, wherein the microwaved multi-ply structure has an oxygen transmission rate that is about 0% to about 2,900% greater than a comparative oxygen transmission rate of a comparative multi-ply structure that has not been microwaved in the pressurized vessel.

Clause 12. The multi-ply structure of any one of clauses 1 to 9, wherein the microwaved multi-ply structure has an oxygen transmission rate that is between 0% to 100% lower than a comparative oxygen transmission rate of a conventional microwaved multi-ply structure.

Clause 13. The multi-ply structure of any one of clauses 1 to 12, further comprising an ink layer located between the barrier film and the first adhesive layer.

Clause 14. The multi-ply structure of any one of clauses 1 to 12, further comprising a second adhesive layer and a first nylon layer, wherein the second adhesive layer is located between the barrier film and the first nylon layer, and the first nylon layer is located between the first and the second adhesive layers.

Clause 15. The multi-ply structure of clause 14, further comprising a third adhesive layer and a second polyester layer, wherein the third adhesive layer is located between the first nylon layer and the second polyester layer, and the second polyester layer is located between the second and the third adhesive layers.

Clause 16. The multi-ply structure of clause 14 or 15, further comprising an ink layer that is located between (i) the barrier film and the second adhesive layer. (ii) the first nylon layer and the second adhesive layer, or (iii) the second adhesive layer and the second polyester layer.

Clause 17. The multi-ply structure of clause 14, further comprising a third adhesive layer and a second nylon layer, wherein the third adhesive layer is located between the barrier film and the second nylon layer, and the second nylon layer is located between the second and the third adhesive layers.

Clause 18. The multi-ply structure of clause 17, further comprising an ink layer that is located between either (i) the barrier film and the third adhesive layer or (ii) the third adhesive layer and the second nylon layer.

Clause 19. The multi-ply film structure of any one of clauses 1 to 12, further comprising a second polyester layer and a second adhesive layer, wherein the second adhesive layer is located between the second polyester layer and the barrier film, and the barrier film is located between the first and the second adhesive layers.

Clause 20. The multi-ply structure of clause 19, further comprising an ink layer that is located between the second polyester layer and the second adhesive layer.

Clause 21. The multi-ply structure of clause 19, further comprising a third adhesive layer and a nylon layer, wherein the nylon layer is located between the first and the third adhesive layers, and the third adhesive layer is located between the barrier film and the nylon layer.

Clause 22. The multi-ply structure of clause 21, further comprising an ink layer that is located between either (i) the second polyester layer and the second adhesive layer or (ii) the second adhesive layer and the barrier film.

Clause 23. The multi-ply structure of any one of clauses 1 to 22, wherein the sealant film comprises a first polypropylene layer that is adjacent to the first adhesive layer.

Clause 24. The multi-ply structure of clause 23, wherein the sealant film further comprises an easy-peel layer.

Clause 25. The multi-ply structure of clause 24, wherein the sealant film further comprises a second polypropylene layer, wherein the easy-peel layer is located between the first and the second polypropylene layers.

Clause 26. The multi-ply structure of any one of clauses 19 to 25, wherein the first polyester layer is adjacent to either (i) the second adhesive layer or (ii) the ink layer.

Clause 27. A package comprising:
a multi-ply structure that defines an interior space of the package; and
a product disposed within the interior space,
wherein the multi-ply structure comprises,
a barrier film comprising a first polyester layer and a silicon oxide layer;
a first adhesive layer; and
a sealant film,
wherein the adhesive layer is located between the barrier film and the sealant film, and
wherein the package has been microwaved in a pressurized vessel.

Clause 28. The package of clause 27, wherein the package is in the form of a pouch.

Clause 29 The package of clause 28, further comprising one or more fitments.

Clause 30. A package comprising:
a container body having a rim, the container body defining an interior space of the package;
product disposed within the interior space; and
a multi-ply structure affixed to the rim, the multi-ply structure comprising:
a barrier film comprising a first polyester layer and a silicon oxide layer;
a first adhesive layer, and
a sealant film,
wherein the first adhesive layer is located between the barrier film and the sealant film, and
wherein the package has been microwaved in a pressurized vessel.

Clause 31. The package of clause 30, further comprising at least one pull tab.

Clause 32. The package of any one of clauses 27 to 31, wherein the pressurized vessel comprises a liquid and the package and the product is at least partially immersed in the liquid.

Clause 33. The package of any one of clauses 27 to 32, wherein the package does not comprise a microwave energy interactive material.

Clause 34. The package of any one of clauses 27 to 33, wherein the multi-ply structure of the microwaved package is flexible.

Clause 35. The package of any one of clauses 27 to 34, wherein the multi-ply structure of the microwaved package is substantially polymeric.

Clause 36. The package of any one of clauses 27 to 35, wherein the microwaved package and product are sterilized.

Clause 37. The package of any one of clauses 27 to 36, wherein the product is a food product or a drink product.

Clause 38. The package of clause 37, wherein the product is pasteurized.

Clause 39. The package of any one of clauses 27 to 38, wherein the multi-ply structure of the microwaved package has a moisture vapor transmission rate from about 0.005 g/100 in$^2$/day to about 0.06 g/100 in$^2$/day.

Clause 40. The package of any one of clauses 27 to 38, wherein the multi-ply structure of the microwaved package has a moisture vapor transmission rate that is about 0% to about 1,100% greater than a comparative moisture vapor transmission rate of a comparative multi-ply structure of a comparative package that has not been microwaved in the pressurized vessel.

Clause 41. The package of any one of clauses 27 to 38, wherein the multi-ply structure of the microwaved package has a moisture vapor transmission rate that is about 50% to about 99% lower than a comparative moisture vapor transmission rate of a conventional multi-ply structure of a conventional microwaved package.

Clause 42. The package of any one of clauses 27 to 41, wherein the multi-ply structure of the microwaved package has an oxygen transmission rate from about 0.001 cc/100 in$^2$/day to about 0.03 cc/100 in$^2$/day.

Clause 43. The package of any one of clauses 27 to 41, wherein the multi-ply structure of the microwaved package has an oxygen transmission rate that is about 0% to about 2,900% greater than a comparative oxygen transmission rate of a comparative multi-ply structure of a comparative package that has not been microwaved in the pressurized vessel.

Clause 44. The package of any one of clauses 27 to 41, wherein the multi-ply structure of the microwaved package has an oxygen transmission rate that is between 0% to 100% lower than a comparative oxygen transmission rate of a conventional multi-ply structure of a conventional microwaved package.

Clause 45. The package of any one of clauses 27 to 44, wherein the multi-ply structure further comprises an ink layer located between the barrier film and the first adhesive layer.

Clause 46. The package of any one of clauses 27 to 44, wherein the multi-ply structure further comprises a second adhesive layer and a first nylon layer, wherein the second adhesive layer is located between the barrier film and the first nylon layer, and the first nylon layer is located between the first and the second adhesive layers.

Clause 47. The package of clause 46, wherein the multi-ply structure further comprises a third adhesive layer and a second polyester layer, wherein the third adhesive layer is located between the first nylon layer and the second polyester layer, and the second polyester layer is located between the second and the third adhesive layers.

Clause 48. The package of clause 46 or 47, wherein the multi-ply structure further comprises an ink layer that is located between (i) the barrier film and the second adhesive layer. (ii) the first nylon layer and the second adhesive layer, or (iii) the second adhesive layer and the second polyester layer.

Clause 49. The package of clause 46, wherein the multi-ply structure further comprises a third adhesive layer and a second nylon layer, wherein the third adhesive layer is located between the barrier film and the second nylon layer, and the second nylon layer is located between the second and the third adhesive layers.

Clause 50. The package of clause 49, wherein the multi-ply structure further comprises an ink layer that is located between either (i) the barrier film and the third adhesive layer or (ii) the third adhesive layer and the second nylon layer.

Clause 51. The package of any one of clauses 27 to 44, wherein the multi-ply structure further comprises a second polyester layer and a second adhesive layer, wherein the second adhesive layer is located between the second polyester layer and the barrier film, and the barrier film is located between the first and the second adhesive layers.

Clause 52 The package of clause 51, wherein the multi-ply structure further comprises an ink layer that is located between the second polyester layer and the second adhesive layer.

Clause 53. The package of clause 51, wherein the multi-ply structure further comprises a third adhesive layer and a nylon layer, wherein the nylon layer is located between the first and the third adhesive layers, and the third adhesive layer is located between the barrier film and the nylon layer.

Clause 54. The package of clause 53, wherein the multi-ply structure further comprises an ink layer that is located between either (i) the second polyester layer and the second adhesive layer or (ii) the second adhesive layer and the barrier film.

Clause 55. The package of any one of clauses 27 to 54, wherein the sealant film comprises a first polypropylene layer that is adjacent to the first adhesive layer.

Clause 56. The package of clause 55, wherein the sealant film further comprises an easy-peel layer.

Clause 57. The package of clause 56, wherein the sealant film further comprises a second polypropylene layer, wherein the easy-peel layer is located between the first and the second polypropylene layers.

Clause 58. The package of any one of clauses 51 to 57, wherein the first polyester layer is adjacent to either (i) the second adhesive layer or (ii) the ink layer.

Clause 59. A method for sterilization, the method comprising:
  feeding a package into a pressurized vessel, the package having product disposed within an interior space of the package, wherein the package comprises a multi-ply structure comprising,
    a barrier film comprising a first polyester layer and a silicon oxide layer,
    a first adhesive layer, and
    a sealant film,
    wherein the first adhesive layer is located between the barrier film and the sealant film, and
  exposing the package and the product within the pressurized vessel to one or more cycles of microwave energy.

Clause 60. The method of clause 59, wherein the pressurized vessel comprises a liquid and the package and the product are at least partially immersed in the liquid when exposed to the microwave energy.

Clause 61. The method of clause 59 or 60, wherein, during each cycle, the package and the product are exposed to about 5 kW to about 40 kW of microwave energy.

Clause 62. The method of any one of clauses 59 to 61, wherein the multi-ply structure of the microwaved package is flexible.

Clause 63. The method of any one of clauses 59 to 62, wherein the multi-ply structure of the microwaved package is substantially polymeric.

Clause 64. The method of any one of clauses 59 to 63, wherein the product is a food product or a drink product, and wherein the product is pasteurized.

Clause 65. The method of any one of clauses 59 to 64, wherein the package does not comprise a microwave energy interactive material.

Clause 66. The method of any one of clauses 59 to 65, wherein the multi-ply structure of the microwaved package has a moisture vapor transmission rate from about 0.005 g/100 in$^2$/day to about 0.06 g/100 in$^2$/day.

Clause 67. The method of any one of clauses 59 to 65, wherein the multi-ply structure of the microwaved package has a moisture vapor transmission rate that is about 0% to about 1,100% greater than a comparative moisture vapor transmission rate of a comparative multi-ply structure of a comparative package that has not been exposed to microwave energy in the pressurized vessel.

Clause 68. The method of any one of clauses 59 to 65, wherein the multi-ply structure of the microwaved package has a moisture vapor transmission rate that is about 50% to about 99% lower than a comparative moisture vapor transmission rate of a conventional multi-ply structure of a conventional microwaved package.

Clause 69. The method of any one of clauses 59 to 68, wherein the multi-ply structure of the microwaved package has an oxygen transmission rate from about 0.001 cc/100 in$^2$/day to about 0.03 cc/100 in$^2$/day.

Clause 70. The method of any one of clauses 59 to 68, wherein the multi-ply structure of the microwaved package has an oxygen transmission rate that is about 0% to about 2,900% greater than a comparative oxygen transmission rate of a comparative multi-ply structure of a comparative package that has not been exposed to microwave energy in the pressurized vessel.

Clause 71. The method of any one of clauses 59 to 68, wherein the multi-ply structure of the microwaved package has an oxygen transmission rate that is between 0% to 100% lower than a comparative oxygen transmission rate of a conventional multi-ply structure of a conventional microwaved package.

Clause 72. The method of any one of clauses 59 to 71, wherein the microwaved package is in the form of a pouch that is formed from the multi-ply structure.

Clause 73. The method of clause 72, wherein the package further comprises one or more fitments.

Clause 74. The method of any one of clauses 59 to 71, wherein the package further comprises a container body having a rim and the multi-ply structure is affixed to the rim.

Clause 75. The method of clause 74, wherein the package comprises at least one pull tab.

Clause 76. The method of any one of clauses 59 to 75, wherein the multi-ply structure further comprises an ink layer located between the barrier film and the first adhesive layer.

Clause 77. The method of any one of clauses 59 to 75, wherein the multi-ply structure further comprises a second adhesive layer and a first nylon layer, wherein the second adhesive layer is located between the barrier film and the first nylon layer, and the first nylon layer is located between the first and the second adhesive layers.

Clause 78. The method of clause 77, wherein the multi-ply structure further comprises a third adhesive layer and a second polyester layer, wherein the third adhesive layer is located between the first nylon layer and the second polyester layer, and the second polyester layer is located between the second and the third adhesive layers.

Clause 79. The method of clause 77 or 78, wherein the multi-ply structure further comprises an ink layer that is located between (i) the barrier film and the second adhesive layer, (ii) the first nylon layer and the second adhesive layer, or (iii) the second adhesive layer and the second polyester layer.

Clause 80. The method of clause 77, wherein the multi-ply structure further comprises a third adhesive layer and a second nylon layer, wherein the third adhesive layer is located between the barrier film and the second nylon layer, and the second nylon layer is located between the second and the third adhesive layers.

Clause 81. The method of clause 80, wherein the multi-ply structure further comprises an ink layer that is located between either (i) the barrier film and the third adhesive layer or (ii) the third adhesive layer and the second nylon layer.

Clause 82. The method of any one of clauses 59 to 75, wherein the multi-ply structure further comprises a second polyester layer and a second adhesive layer, wherein the second adhesive layer is located between the second polyester layer and the barrier film, and the barrier film is located between the first and the second adhesive layers.

Clause 83. The method of clause 82, wherein the multi-ply structure further comprises an ink layer that is located between the second polyester layer and the second adhesive layer.

Clause 84. The method of clause 82, wherein the multi-ply structure further comprises a third adhesive layer and a nylon layer, wherein the nylon layer is located between the first and the third adhesive layers, and the third adhesive layer is located between the barrier film and the nylon layer.

Clause 85. The method of clause 84, wherein the multi-ply structure further comprises an ink layer that is located between either (i) the second polyester layer and the second adhesive layer or (ii) the second adhesive layer and the barrier film.

Clause 86. The method of any one of clauses 59 to 85, wherein the sealant film comprises a first polypropylene layer that is adjacent to the first adhesive layer.

Clause 87 The method of clause 86, wherein the sealant film further comprises an easy-peel layer.

Clause 88. The method of clause 87, wherein the sealant film further comprises a second polypropylene layer, wherein the easy-peel layer is located between the first and the second polypropylene layers.

Clause 89. The method of any one of clauses 82 to 88, wherein the first polyester layer is adjacent to either (i) the second adhesive layer or (ii) the ink layer.

Clause 90. A microwaved multi-ply structure, as disclosed herein.

Clause 91. A microwaved package, as disclosed herein.

Clause 92. A method for sterilization of a package, as disclosed herein.

For the purposes of describing and defining the present teachings, it is noted that unless indicated otherwise, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:
1. A package comprising:
   a multi-ply structure that defines an interior space of the package, the multi-ply structure comprising:
      a barrier film comprising a first polyester layer and a silicon oxide layer;
      a sealant film; and
      a first adhesive layer comprising a solvent-based polyurethane adhesive located between the barrier film and the sealant film;
      wherein the multi-ply structure does not comprise a microwave energy interactive material, and
   a product disposed within the interior space, wherein the package has been microwaved in a pressurized vessel.

2. The package of claim 1, wherein the package is in the form of a pouch.

3. The package of claim 1, wherein the microwaved multi-ply structure has a moisture vapor transmission rate from about 0.005 g/100 in$^2$/day to about 0.06 g/100 in$^2$/day.

4. A package comprising:
   a container body having a rim, the container body defining an interior space of the package;
   product disposed within the interior space; and
   a multi-ply structure affixed to the rim comprising:
      a barrier film comprising a first polyester layer and a silicon oxide layer;
      a sealant film; and
      a first adhesive layer comprising a solvent-based polyurethane adhesive located between the barrier film and the sealant film;
      wherein the multi-ply structure does not comprise a microwave energy interactive material, and
   wherein the package has been microwaved in a pressurized vessel.

5. The package of claim 4, wherein the multi-ply structure of the microwaved package has a moisture vapor transmission rate from about 0.005 g/100 in$^2$/day to about 0.06 g/100 in$^2$/day.

6. The package of claim 4, wherein the multi-ply structure of the microwaved package has a moisture vapor transmission rate that is about 50% to about 99% lower than a comparative moisture vapor transmission rate of a comparative multi-ply structure of a conventional microwaved package.

7. The package of claim 4, wherein the multi-ply structure of the microwaved package has an oxygen transmission rate from about 0.001 cc/100 in$^2$/day to about 0.03 cc/100 in$^2$/day.

8. The package of claim 4, wherein the multi-ply structure of the microwaved package has an oxygen transmission rate that is about 0% to about 2,900% greater than a comparative oxygen transmission rate of a comparative multi-ply structure of a comparative package that has not been microwaved in the pressurized vessel.

9. The package of claim 4, wherein the multi-ply structure of the microwaved package has an oxygen transmission rate that is between 0% to 100% lower than a comparative oxygen transmission rate of a conventional multi-ply structure of a conventional microwaved package.

10. The package of claim 4, wherein the multi-ply structure further comprises a second adhesive layer and a first nylon layer, wherein the second adhesive layer is located between the barrier film and the first nylon layer, and the first nylon layer is located between the first and the second adhesive layers.

11. The package of claim 10, wherein the multi-ply structure further comprises a third adhesive layer and a second polyester layer, wherein the third adhesive layer is located between the first nylon layer and the second polyester layer, and the second polyester layer is located between the second and the third adhesive layers.

12. The package of claim 10, wherein the multi-ply structure further comprises an ink layer that is located between (i) the barrier film and the second adhesive layer, (ii) the first nylon layer and the second adhesive layer, or (iii) the second adhesive layer and the second polyester layer.

13. The package of claim 10, wherein the multi-ply structure further comprises a third adhesive layer and a second nylon layer, wherein the third adhesive layer is located between the barrier film and the second nylon layer, and the second nylon layer is located between the second and the third adhesive layers.

14. The package of claim 4, wherein the multi-ply structure further comprises a second polyester layer and a second adhesive layer, wherein the second adhesive layer is located between the second polyester layer and the barrier film, and the barrier film is located between the first and the second adhesive layers.

15. The package of claim 14, wherein the multi-ply structure further comprises a third adhesive layer and a nylon layer, wherein the nylon layer is located between the first and the third adhesive layers, and the third adhesive layer is located between the barrier film and the nylon layer.

16. The package of claim 4, wherein the sealant film comprises a first polypropylene layer that is adjacent to the first adhesive layer.

17. The package of claim 16, wherein the sealant film further comprises an easy-peel layer.

18. The package of claim 17, wherein the sealant film further comprises a second polypropylene layer, wherein the easy-peel layer is located between the first and the second polypropylene layers.

19. A package comprising:
a multi-ply structure that defines an interior space of the package, the multi-ply structure comprising:
a barrier film comprising a first polyester layer and a silicon oxide layer;
a sealant film; and
a first adhesive layer comprising a solvent-based polyurethane adhesive located between the barrier film and the sealant film;
wherein the multi-ply structure does not comprise a microwave energy interactive material, and
wherein the package is configured to contain a product disposed within the interior space, and wherein the package is configured to be microwaved in a pressurized vessel.

20. The package of claim 19, wherein when the package has been microwaved in the pressurized vessel, the multi-ply structure of the microwaved package has an oxygen transmission rate from about 0.001 cc/100 in$^2$/day to about 0.03 cc/100 in$^2$/day.

* * * * *